(12) United States Patent
Bell et al.

(10) Patent No.: US 7,985,074 B2
(45) Date of Patent: Jul. 26, 2011

(54) METHOD AND APPARATUS FOR IMPROVING MATH SKILLS

(75) Inventors: Max Bell, Pacific Grove, CA (US); Hoanganh T. (HT) Nguyen, Cupertino, CA (US)

(73) Assignee: Chicago Science Group, L.L.C., Seattle, WA (US)

( * ) Notice: Subject to any disclaimer, the term of this patent is extended or adjusted under 35 U.S.C. 154(b) by 1109 days.

(21) Appl. No.: 10/335,118

(22) Filed: Dec. 31, 2002

(65) Prior Publication Data

US 2004/0126745 A1 Jul. 1, 2004

(51) Int. Cl.
G09B 5/00 (2006.01)

(52) U.S. Cl. ........................................ 434/201

(58) Field of Classification Search ............... 434/201, 434/188
See application file for complete search history.

(56) References Cited

U.S. PATENT DOCUMENTS

| | | | |
|---|---|---|---|
| 2,921,358 A | | 1/1960 | Hamilton |
| 4,051,608 A * | | 10/1977 | Duncan ................. 434/201 |
| 4,259,788 A | | 4/1981 | Wilson |
| 5,743,746 A * | | 4/1998 | Ho et al. ................. 434/332 |
| 5,779,486 A * | | 7/1998 | Ho et al. ................. 434/353 |
| 5,863,208 A * | | 1/1999 | Ho et al. ................. 434/362 |
| 5,863,209 A | | 1/1999 | Kim |
| 5,863,771 A * | | 1/1999 | Aga et al. ................. 435/101 |
| 6,018,617 A | | 1/2000 | Sweitzer |
| 6,527,556 B1 | | 3/2003 | Koskinen |
| 6,840,774 B2 * | | 1/2005 | Fretwell, Jr. ............. 434/201 |
| 6,905,340 B2 * | | 6/2005 | Stansvik ................ 434/322 |
| 7,052,277 B2 * | | 5/2006 | Kellman ................ 434/118 |
| 2002/0055089 A1 * | | 5/2002 | Scheirer ................ 434/350 |
| 2003/0036045 A1 * | | 2/2003 | Vivian ................... 434/350 |
| 2004/0180317 A1 * | | 9/2004 | Bodner et al. ........... 434/353 |
| 2005/0196730 A1 | | 9/2005 | Kellman |
| 2008/0140652 A1 * | | 6/2008 | Millman et al. .......... 707/6 |
| 2010/0279265 A1 * | | 11/2010 | Heffernan .............. 434/350 |

OTHER PUBLICATIONS

"Flashcards for Kids! Addition, Subtraction, Mulitplication, Division." <URL: http://allmath.com/flashcards.asp>. Arbor Media, Inc. 2000. [Retrieved Nov. 17, 2005].*
"Flashcards for Kids!" <URL: http://www.edu4kids.com/math>. CANITech, 1999. [Retrieved Nov. 17, 2005].*
Rudner, Lawrence M. "An On-line, Interactive, Computer Adaptive Testing Tutorial." 1998. <URL: http://edres.org/scripts/cat/catdemo.htm> [Retrieved Nov. 22, 2005].*
"Math Flash: A Flash Card Program for Drill and Practice." <URL: http://hiwaay.net/~palmer/mathflash.html> 2000. [Retrieved Nov. 23, 2005].*
"QuizRocket: The fasterst, easiest way to create quizzes for the web!" <URL: http://www.learningware.com/quizrocket>. 2001. [Retrieved Nov. 22, 2005].*
"Microsoft Excel 2000 screenshots." Microsoft Corporation. 1985-1999.*

(Continued)

Primary Examiner — Pierre E Elisca
(74) Attorney, Agent, or Firm — K&L Gates LLP

(57) ABSTRACT

A method and apparatus for improving math skills is provided. The method and apparatus present groups of problems to a student in a sequential manner, and award points to the student when the student enters a correct response. Statistics regard the student's performance are recorded and may be viewed in a variety of selectable formats so that parents, teachers, and other interested parties can track the students progress.

25 Claims, 20 Drawing Sheets

OTHER PUBLICATIONS

Rudner, Lawrence M. "An On-line, Interactive, Computer Adaptive Testing Tutorial." 1998. <URL: http://edres.org/scripts/cat/catdemo.htm> [Retrieved Nov. 22, 2005].*

"GRE Diagnostic Service." Educational Testing Service. 1999. <URL: http://grediagnostic.ets.org:443/basic/> [Retreived on Nov. 18, 2005].*

John G. McMillin, On the use of three Dimensional Graphs, The American Biology Teacher, Feb. 1969, pp. 86-88.*

"Graduates Record Examination." <URL:http://www.infozee.com/indiatimes/tests/gre/about-gre.htm> Eazy Softech Pvt. Ltd, 2000. [Retreived Nov. 17, 2005].

"GRE." Graduates Hotline International Education Network. 2002. <URL: www.graduateshotline.com/gre.html> [Retrieved Nov. 25, 2005].

"GRE Test Preparation." Galt Western Personnel Ltd. 2000. <URL: http://www.coursearch.com/articles/school/gre/GreTestPrep.html>. [Retrieved Nov. 18, 2005].

* cited by examiner

METHOD AND APPARATUS FOR IMPROVING MATH SKILLS

BACKGROUND OF THE INVENTION

The present invention relates to a method and apparatus for improving math skills. An embodiment of the present invention may be employed to improve a student's math skills and to track and monitor the student's progress.

Strong educational skills are an important component for a successful and productive member of society. In addition, educational skills are constantly measured and used as a benchmark for schools, teachers and individual students. Accordingly, many organizations and groups of people including state, local and federal governments, teachers and parents are constantly striving to find new ways to improve a student's educational skills.

Mathematical skills are vital educational skills that are often targeted for improvement in today's technology driven world. Accordingly, students are pushed to excel in mathematics related subjects and classes. However, it is also important to allow students to work at their own pace, even if that pace is slower or faster than a teacher or parent might desire. A student may feel discouraged or overwhelmed if the pace at which they are learning is too fast or simply bored if the pace is too slow for them. Therefore, it is desirable to provide a student with an environment and method of learning where progress is encouraged without discouraging or overwhelming the student and maintaining the student's interest.

In addition, it is necessary to evaluate a student's progress in mathematics related subjects and classes. Many students receive grades or evaluations in their subject and classes, but standard grades and evaluations do not always accurately reflect a student's progress or areas where a student needs improvement. Therefore, it is desirable to track and monitor a student's progress and to identify, for example, problem areas or areas in which a student needs improvement.

SUMMARY OF THE INVENTION

The present invention provides a method and apparatus for improving a student's math performance. An advantage of the present invention is that it improves a student's math skills and enables a teacher or parent to supervise or track the student's progress. A feature of the present invention is that it compiles an ongoing record of the student's progress that can be viewed and sorted by a number of statistical categories.

According to an embodiment of the present invention, a method for improving a student's math performance is provided. The inventive method includes the steps of displaying a first math problem, receiving a response to the problem from the student and determining whether the student's response is correct. If the student's response is incorrect, an indication is displayed that the response is incorrect and the student is allowed to continually provide answers until the correct response is received. Thereafter, the student is awarded a predetermined number of points when it is determined that the student has provided a correct response. The predetermined number of points are added to a running total of points awarded to the student.

The inventive method then sequentially displays additional math problems to the student upon receiving a correct response to each previously displayed math problem and continually receives responses from and awards points to the student for the additional math problems as with the first math problem. Thus, the method presents practice problems to the student in a game-like format, with the running point total serving as the student's score. In one embodiment there are no time limits on the problems, and the student may practice at his or her own pace. In alternative embodiments, time limits may be imposed on individual problems or an entire problem session. One feature of this embodiment is that statistics are maintained regarding the student's performance on the problems.

In one embodiment, the performance statistics include the number of responses received from the student for each problem before a correct response is received. In another embodiment, the statistics include an amount of time required by the student to respond correctly to each problem.

One advantage of the present invention is that the level of difficulty of the problems displayed may be selected or changed. Accordingly, in one embodiment the performance statistics include one or more parameters indicative of the level of difficulty selected for each problem. In addition, the parameters may include the number of digits to be included in the first operand of the problems, and another parameter may also include the number of digits to be included in the second operand of the problems. In yet another embodiment, one or more mathematical operators are selected and employed in the displayed math problems. One additional feature of the present invention includes displaying the performance statistics in a number of selectable formats.

According to another embodiment of the present invention, an apparatus for interactively improving a student's math skills and tracking the student's progress is provided. The apparatus includes a display adapted to display math problems, an input interface for receiving the student's responses to the math problems displayed on the display, and a processor. The processor is adapted to generate the math problems displayed on the display, evaluate the student's responses in order to determine whether the student has correctly answered the problems, and to award points to the student when the student correctly answers a problem. The apparatus further includes a memory for storing statistics related to the student's performance in answering the problems.

In one embodiment, the apparatus is a personal computer or a server. In an alternative embodiment, the apparatus is a handheld device, for example, a programmable personal digital assistant. The handheld device of the present invention is configured to transfer the statistics stored in the memory to another device such as a personal computer, a server or a computer network via a synchronization function performed between the handheld device and the other device.

One advantage of the present invention is that the processor can be adapted to parse the statistics and to cause the display to display the statistics in a graphical manner. In one embodiment, the statistics are displayed as a 3-dimensional graph. The 3-dimensional graph preferably includes a first axis and a second axis which relate to the complexity of the problems addressed by the student, and a third axis which relates to the student's performance on the problems. For instance, the first axis could represent a number of digits in a first operand of the problems addressed by the student, and the second axis could represent a number of digits in a second operand of the problems addressed by the student. In one embodiment, the data represented by the third axis is selectable. The data represented by the third axis is preferably selected from the group of data including the number of problems attempted, a number of correct responses, a number of incorrect responses, an average time required for each correct answer, and an average time for each incorrect answer. In one embodiment, the statistics displayed in the 3-dimensional graph are selectable according to mathematical operators employed in the problems. Preferably, the statistics relating problems employing different mathematical operators are displayed in different colors.

In still another embodiment of the present invention, a method of tracking a student's progress in developing math skills is provided. The method includes the steps of generating and sequentially displaying a number of problems to be solved by the student, receiving the student's answers to the problems, maintaining a database which records each problem presented to the student and every response received from the student to each problem presented, and displaying statistics regarding the student's performance in at least one of a number of selectable formats.

In one embodiment, the problems being generated and displayed are presented in a game-like format where the student is awarded points for providing correct answers to the problems. In addition, the next problem in a sequence of problems is not displayed until the correct answer has been received for the immediately preceding problem.

One advantage of the inventive method is that the selectable formats for displaying the statistics include at least one of a number of formats, such as a graphical format, an alphanumeric text format, and a tabular format. Further, the displayed statistics can include any combination of a number of problems attempted by the student, a number of digits in a first operand of the problems attempted by the student, a number of digits in a second operand of the problems attempted by the student, the mathematical operator employed in each problem, the number of incorrect answers to each problem received from the student, the number of correct responses received from the student, the amount of time required for the student to answer each problem, and the average time to answer each problem.

A further advantage is that the selectable formats for displaying performance may include a 3-dimensional graph. The 3-dimensional graph includes a first axis and a second axis which relate to the complexity of the problems addressed by the student, and a third axis which relates to the student's performance on said problems. In one embodiment, the first axis represents the number of digits in the first operand of the problems addressed by the student, and the second axis represents the number of digits in the second operand of the problems addressed by the student. Preferably, the data represented by said third axis is selectable. For example, the data represented by the third axis may be selectable from a group of data including the number of problems attempted, the number correct student responses, the number of incorrect student responses, the average time for each correct answer, and the average time for each incorrect answer. By employing the present invention, the statistics displayed in the 3-dimensional graph are selectable according to mathematical operators, or problems having different mathematical operators may be displayed together using different colors.

In yet another embodiment of the present invention, a method of tracking a group of students' progress in developing math skills is provided. The method includes the steps of generating and sequentially displaying a number of problems to be solved by each of the students, receiving each of the students' answers to the problems, and maintaining a database which records each problem presented to each of the students and every response received from each of the students to each problem presented. Subsequently, statistics are displayed according to the method, where the statistics reflect the group of students' performance. The statistics are displayed in at least one of a number of selectable formats.

Additional features and advantages of the present invention are described in, and will be apparent from, the following Detailed Description of the Invention and the figures.

DETAILED DESCRIPTION OF THE INVENTION

The present invention relates to a method and apparatus for improving a student's math performance. The present invention improves a student's math skills by enabling the student to work at their own pace and by encouraging the student to continually aim for the correct answer. In addition, the present invention also enables one such as a teacher or parent to supervise, monitor and track the student's progress by compiling an ongoing record of the student's progress and performance statistics related to the student's progress. The student's progress record therefore may to be viewed and sorted by a number of statistical categories.

In one embodiment according to the present invention, a number of mathematical problems are generated and displayed, during a problem session, in a game-like format. In this embodiment, the student is awarded points for providing correct answers to the problems. Even though a game-like format is used in this embodiment, it should be appreciated that any suitable format can be used for presenting problems during a problem session.

Figure 1:
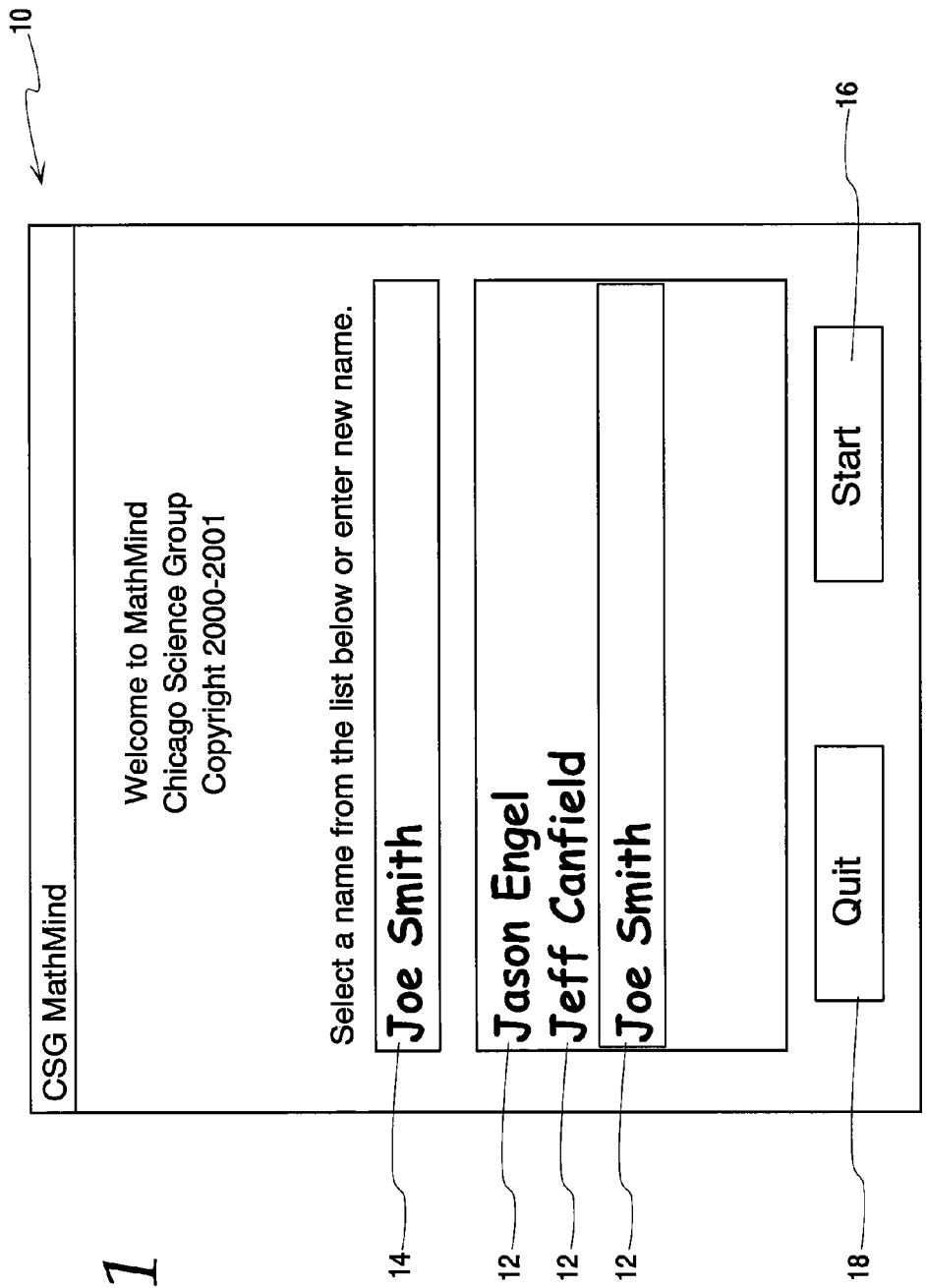
FIG. 1 is a diagram illustrating a screen for logging a student into a problem session.

FIG. 1 shows a logon screen 10 for logging a student into a problem session. The student either selects their name from the listed names 12 or types their name in the selection space 14. If the student types their name in the selection space 14, then their name will be added to the listed names 12 the next time the student logs into a problem session. Here, the student has selected one of the listed names 12 as indicated by the highlighted name "Joe Smith," thereby causing the name to be also be listed in the selection space 14. Once the student has selected or entered their name, they are ready to log into the problem session by pressing start button 16. Alternatively, the student may quit without logging in by pressing the quit button 18. Once the student presses the start button 16, the problem session begins.

Figure 2:
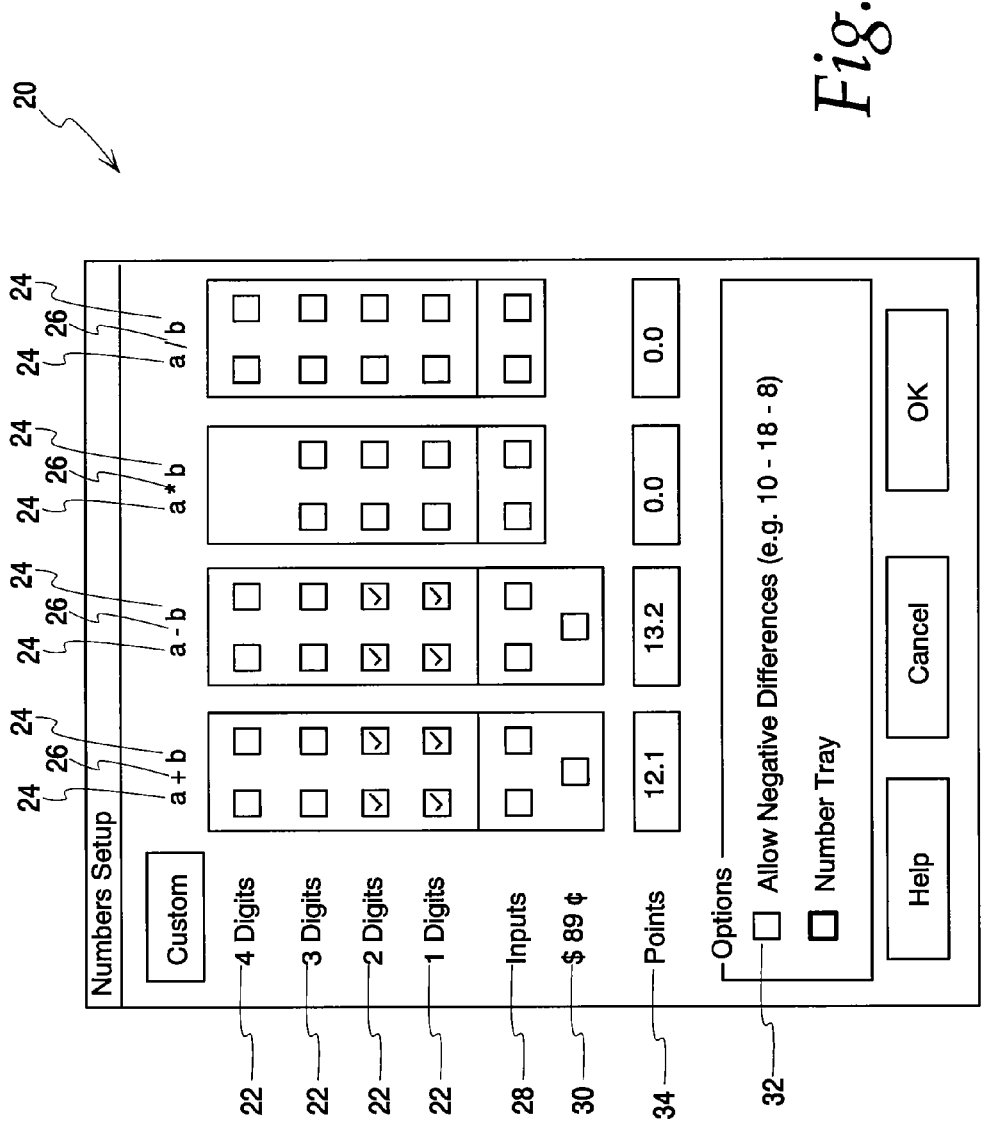
FIG. 2 is a diagram illustrating a screen for selecting parameters for a problem session.

According to an embodiment of the present invention, the problems displayed during the problem session may be customized. FIG. 2 shows a setup screen 20 for selecting or customizing parameters to be used for the problems displayed during the problem session. Here, the number of digits 22 for each operand 24 of the problems displayed during the problem session may be customized. In addition, by selecting the number of digits 22 for each operand 24, the mathematical operators 26 to be employed with each of the operands 24 of the displayed problems may also be selected.

If desired, each of the operands 24 of the displayed problems can be customized to employ negative inputs 28. As an alternative to using standard numbers, the setup screen 20 enables the displayed problems to be customized to employ currency indicators 30. However, it should be realized that in the setup screen 20, currency indicators 30 are only available for the mathematical operators 26 of addition and subtraction. The setup screen 20 also includes a negative differences option 32 that allows the use of negative differences for the answer to the displayed problems.

As will be discussed below, the problem session awards points to the student for each correct answer. In one embodiment, the points awarded vary based on the level of difficulty selected for the problem session. Accordingly, the setup screen 20 displays the point base 34 for the number of digits 22, operands 24, and mathematical operators 26 selected. It should be appreciated that as the selected level of difficulty increases, the point base 34 will also increase. For instance, increasing the number of digits 22 from "2 digits" to "3 digits" causes the point base 34 to increase. Thus, an increased level of difficulty generally results in an increased number of points awarded. In this manner, the student is encouraged to increase the difficulty level as their proficiency improves in order to receive the increased points awarded for more difficult problems.

In an embodiment, the answer to the displayed problem can be limited. For instance, the answer could be required to be less than or equal to an integer N. Thus, each answer to the displayed problem would be less that or equal to N, where N is an integer. In an embodiment, N is a whole positive number. It should be appreciated that limiting the answer in this fashion allows for the customization of the difficulty level of the displayed problems.

In the above-described embodiment, the customization parameters are directed towards the level of difficulty of the problems displayed during the problem session. However, it should be appreciated that any suitable parameters may be customized during the problem session. For example, the format in which the equations or problems are displayed on the screen may be customized. In one embodiment, the problems are displayed in a vertical format. Alternatively, the problems may be displayed in a horizontal format.

In addition, for instance, the algebraic format of the equations or problems can be customized. In one embodiment, the solution to the displayed problem is the only unknown value, that is, the student correctly answers the displayed problem by supplying the correct solution. Alternatively or in combination with solution to the displayed problem, the unknown value could include the mathematical operator and either of the operands. Therefore, the student might be required to supply the mathematical operator or the missing operand from the displayed problem in order to correctly answer the displayed problem.

Once the problem session parameters have been customized as desired, the problem session begins. It should be appreciated however that the problem session parameters do not have to be customized each time a problem session begins. Accordingly, in an embodiment, default problem session parameters are used to begin a problem session. In another embodiment, the session parameters from the student's previous session may be used as the default parameters.

Figure 3:
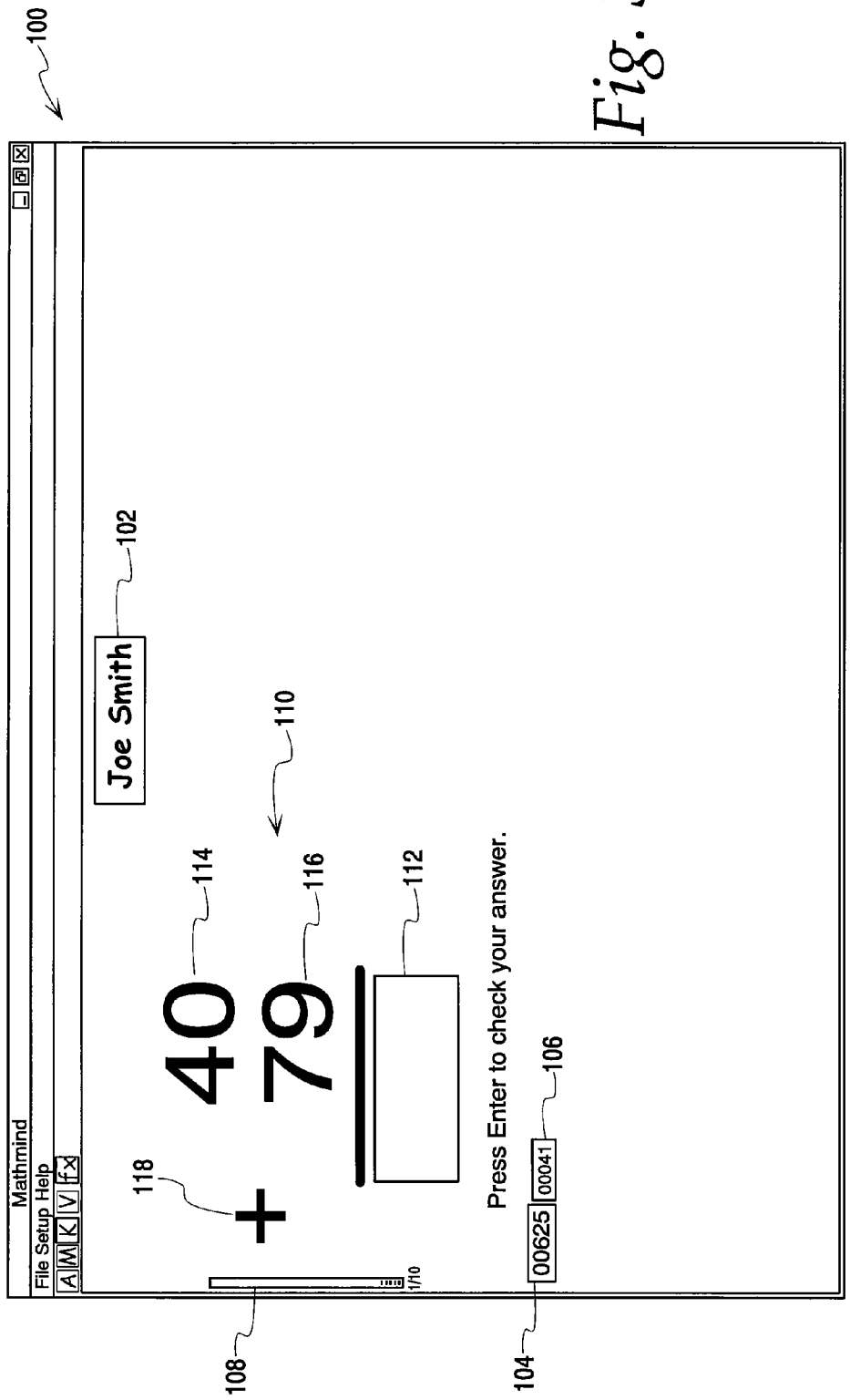
FIGS. 3-10 are diagrams illustrating a screen for displaying problems during a problem session.
Figure 4:
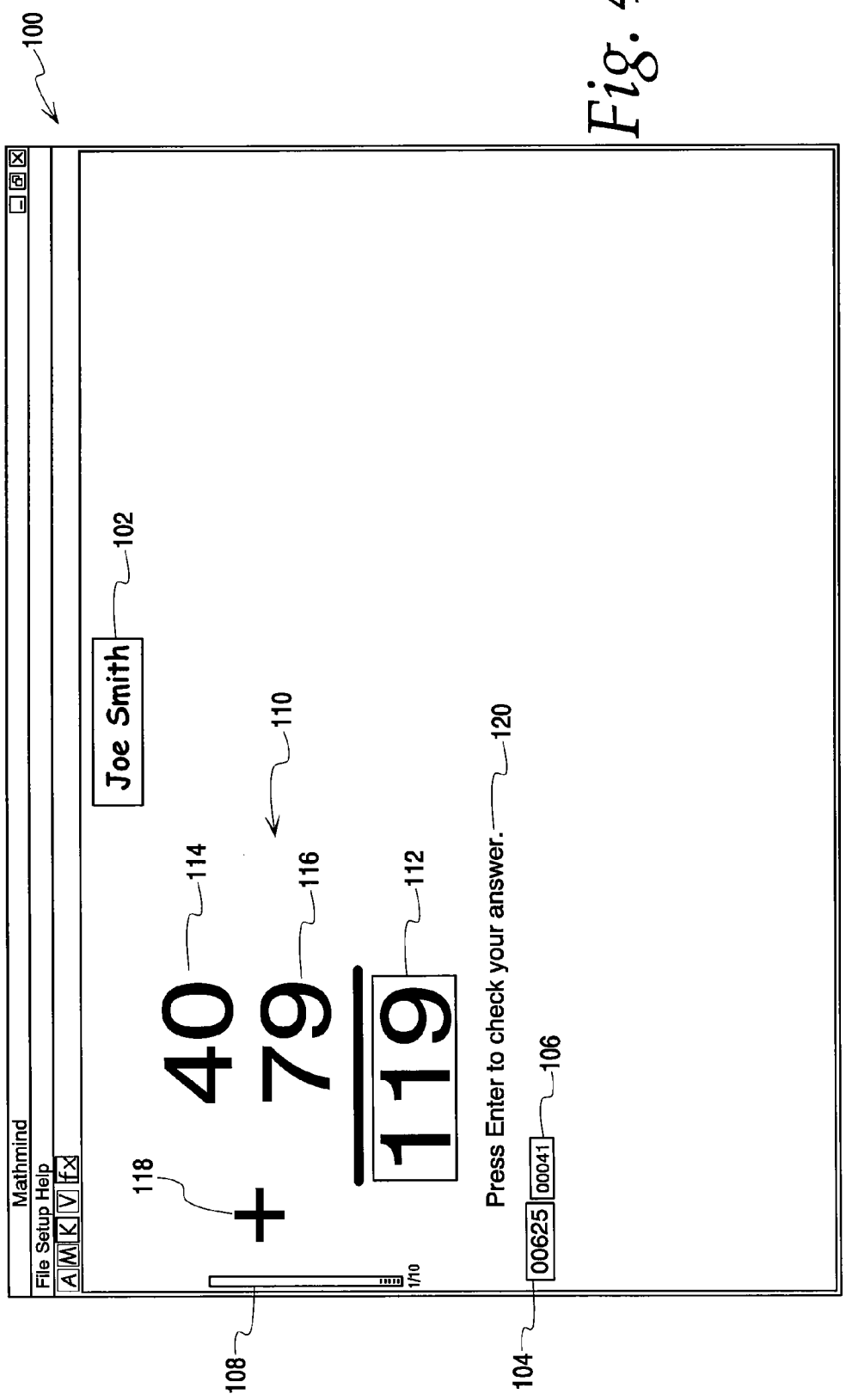
Figure 5:
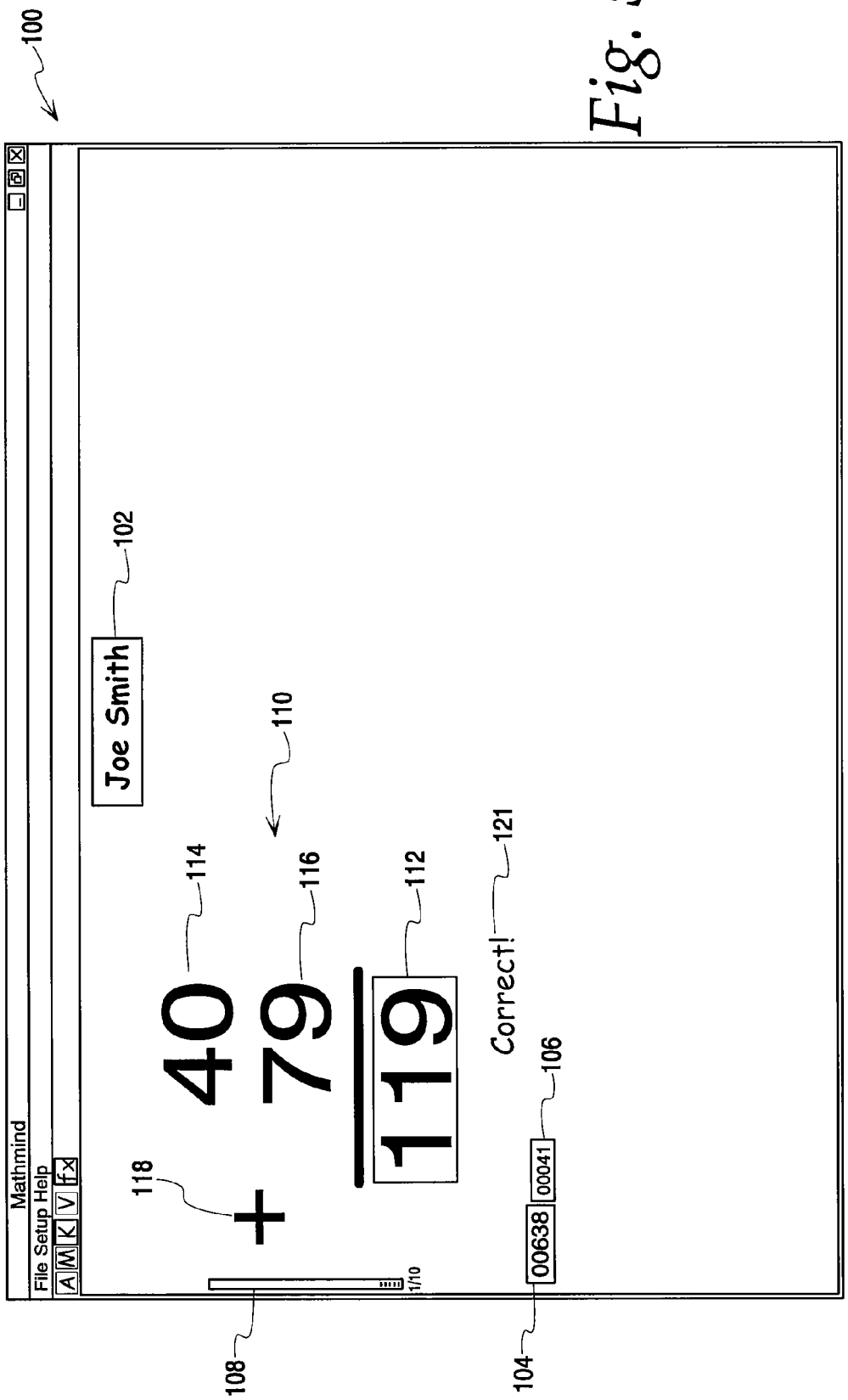
Figure 6:
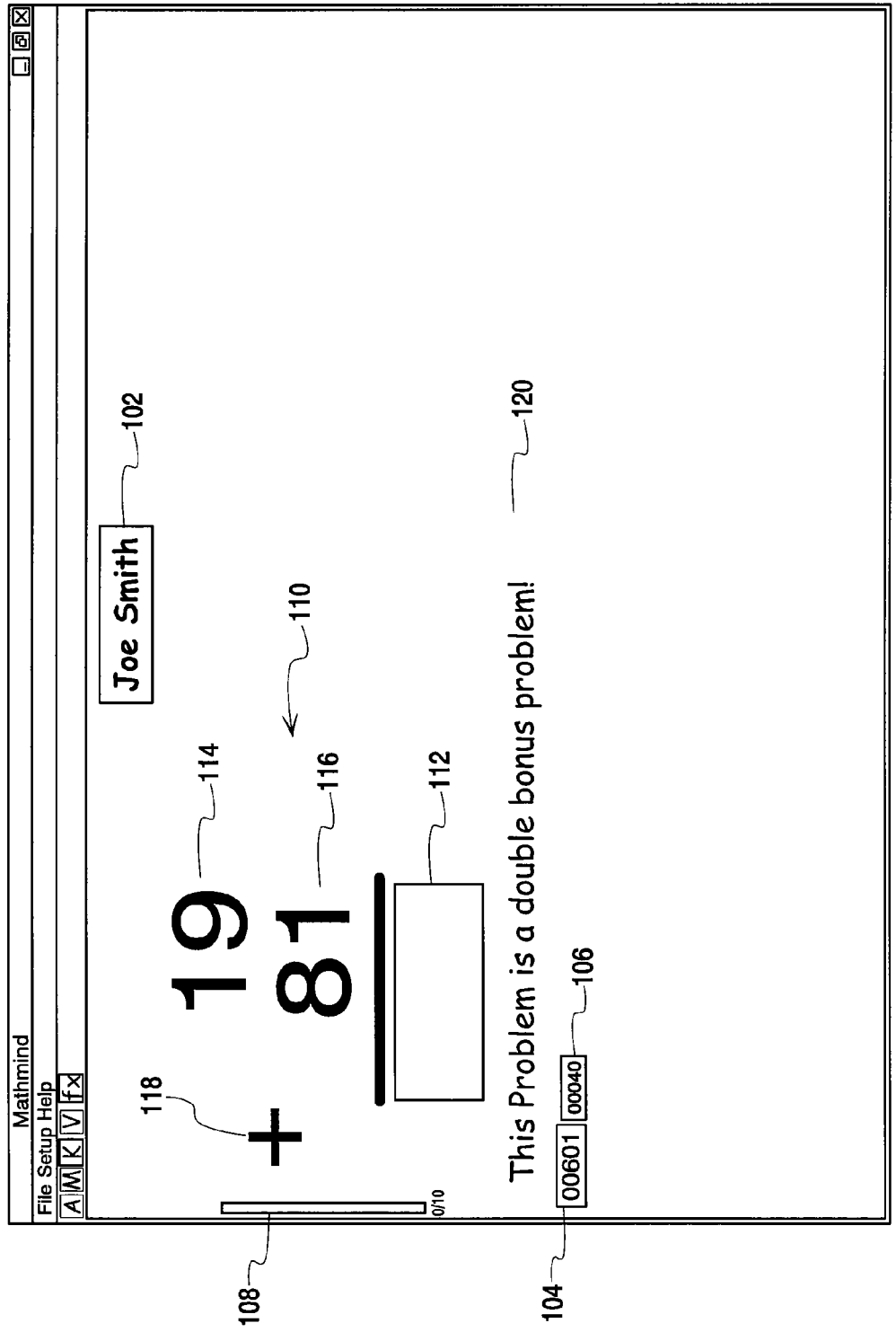

FIGS. 3-10 are diagrams illustrating a problem screen 100 for displaying problems during a problem session. The problem screen 100 in FIGS. 3-5 illustrates a first displayed problem. The problem screen 100 in FIGS. 6-10 illustrate a second displayed problem. The problem as displayed in FIGS. 3-10 collectively illustrate various portions of a problem session according to one embodiment of the present invention.

Referring now to FIG. 3, the student's name 102 is displayed in the center of the problem screen 100, thereby indicating that a problem session has been initiated for the named student 102 and that the results of the problem session will be stored as part of the named student's overall progress record and performance statistics. The student's overall point total 104 and overall number of correct answers 106 are also displayed in the problem screen 100.

In addition, progress meter 108 indicates how many questions the student has answered correctly for this problem session. The progress meter 108 indicates that the student has already correctly answered one out of ten questions. In one embodiment, the progress meter 108 resets to zero after the student correctly answers ten questions. Alternatively, the progress meter 108 may be reset after any suitable number of questions have been correctly answered. It should also be appreciated that the progress meter 108 could be used to indicate the end of a problem session. Therefore, the progress meter 108 could be used to show that the problem session ends when the student has correctly answered, for example, ten problems.

The problems 110 displayed in FIGS. 3-5 includes a first operand 114, a second operand 116, an operator 118 and a solution window 112. The first operand 114 is the number forty, the second operand 118 is the number 79 and the operator 118 is the +symbol for addition. Thus, the student must correctly answer the problem 40+79=? and enter the correct answer in the solution window 112.

Referring now to FIG. 4, the student has performed the calculation indicated by the displayed problem and has entered an answer in the solution window 112. In this case, the student has entered the number 119 into the solution window 112. As indicated by answer prompt 120, the student must press the enter button (not shown) on the keyboard to check the answer. In this embodiment, the student presses the enter button to check the answer, but it should be appreciated that any suitable button on the keyboard could be used to check the student's answer. Alternatively, the student could be required to press or click a button (not shown) on the problem screen 100 in order to check the answer.

In FIG. 5 the student has answered the problem and pressed the enter button to check the answer. The answer supplied by the student, "119", is correct as indicated by answer prompt 121. In addition, the student's overall point total 104 has been updated from "625" to "638" to reflect the points awarded (i.e., thirteen points) to the student for correctly answering the displayed problem 110. After awarding the points for the correct answer, the problem session automatically advances to the next displayed problem and the problem session continues in this fashion.

The problem screen 100 shown in FIGS. 6-10 shows a previous problem 110 from the same problem session.

In this problem the first operand 114 is the number nineteen, the second operand 116 is the number eighty-one, and the operator 118 is again the addition symbol "+". Thus, to correctly solve this problem the student must enter the correct value for the problem 19+81=? in the solution window 112. The main difference between the problem displayed in FIGS. 6-10 and that displayed in FIGS. 3-5 (other than the different operands) is that the problem in FIGS. 6-10 has been designated as a "double bonus problem", as indicated in the answer prompt 120.

Once the student correctly answers the displayed problem 110, points will be awarded to the student, as described above. However, since the displayed problem 110 is a double bonus problem, the points awarded to the student will be doubled. In one embodiment, double bonus problems occur randomly. Alternatively, double point bonuses are awarded for problems with a predetermined level of difficulty.

Figure 7:
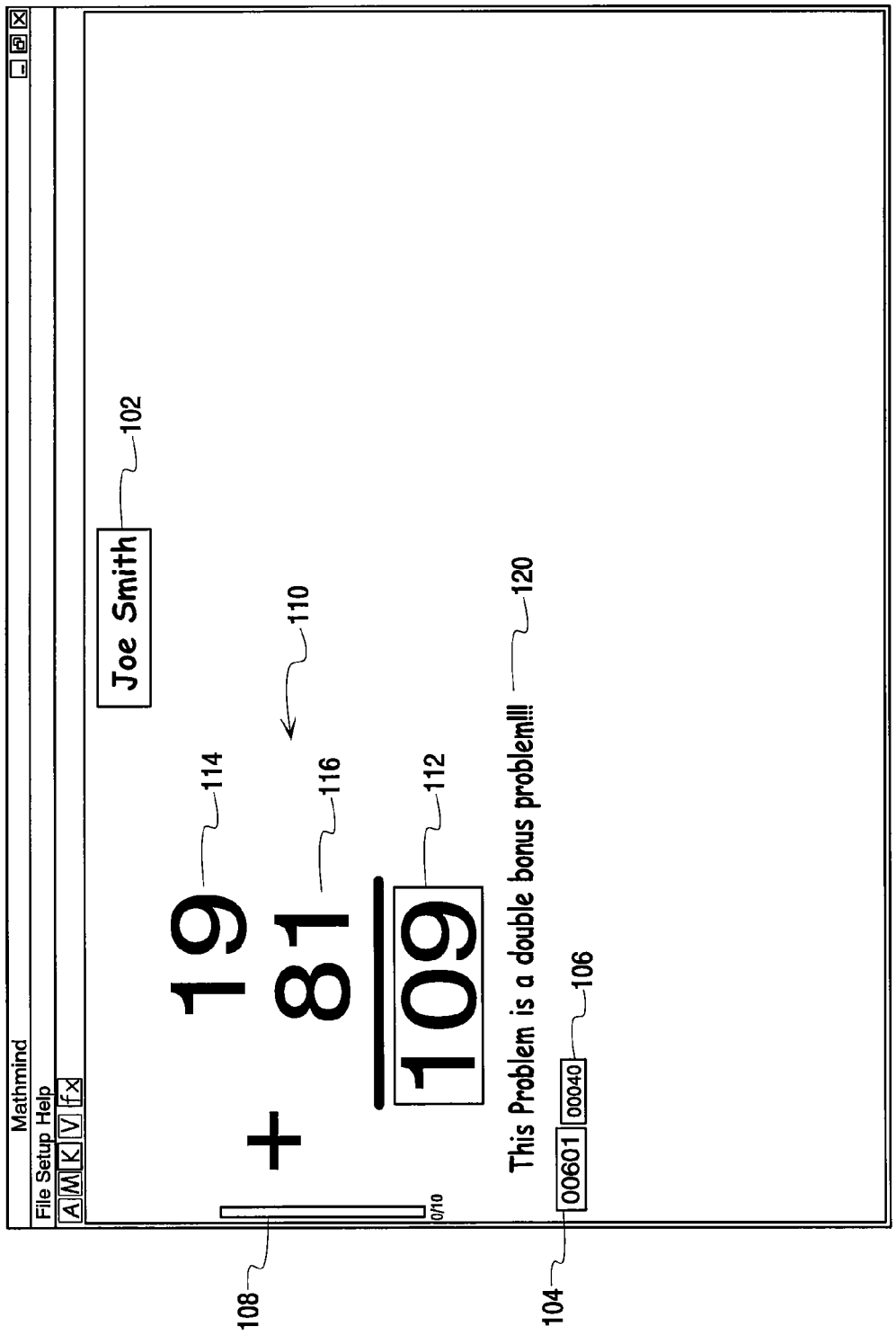

Referring now to FIG. 7, the student has performed the calculation indicated by the displayed problem 110 (i.e., 19+81=?) and has entered an answer in the solution window 112. The answer entered by the student is the number "109." As described above, the student must press the enter button on the keyboard to check the answer.

Figure 8:
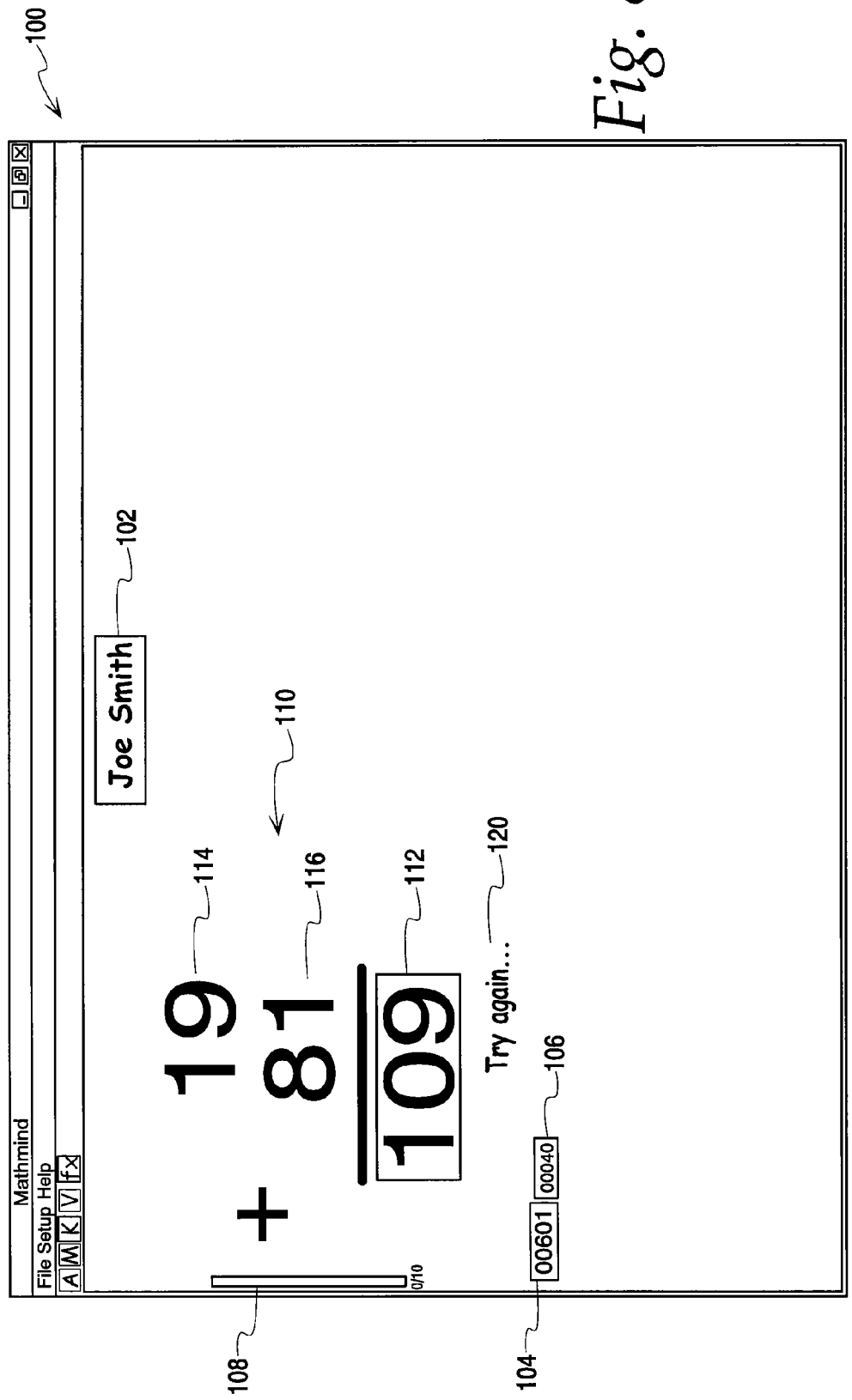
Figure 9:
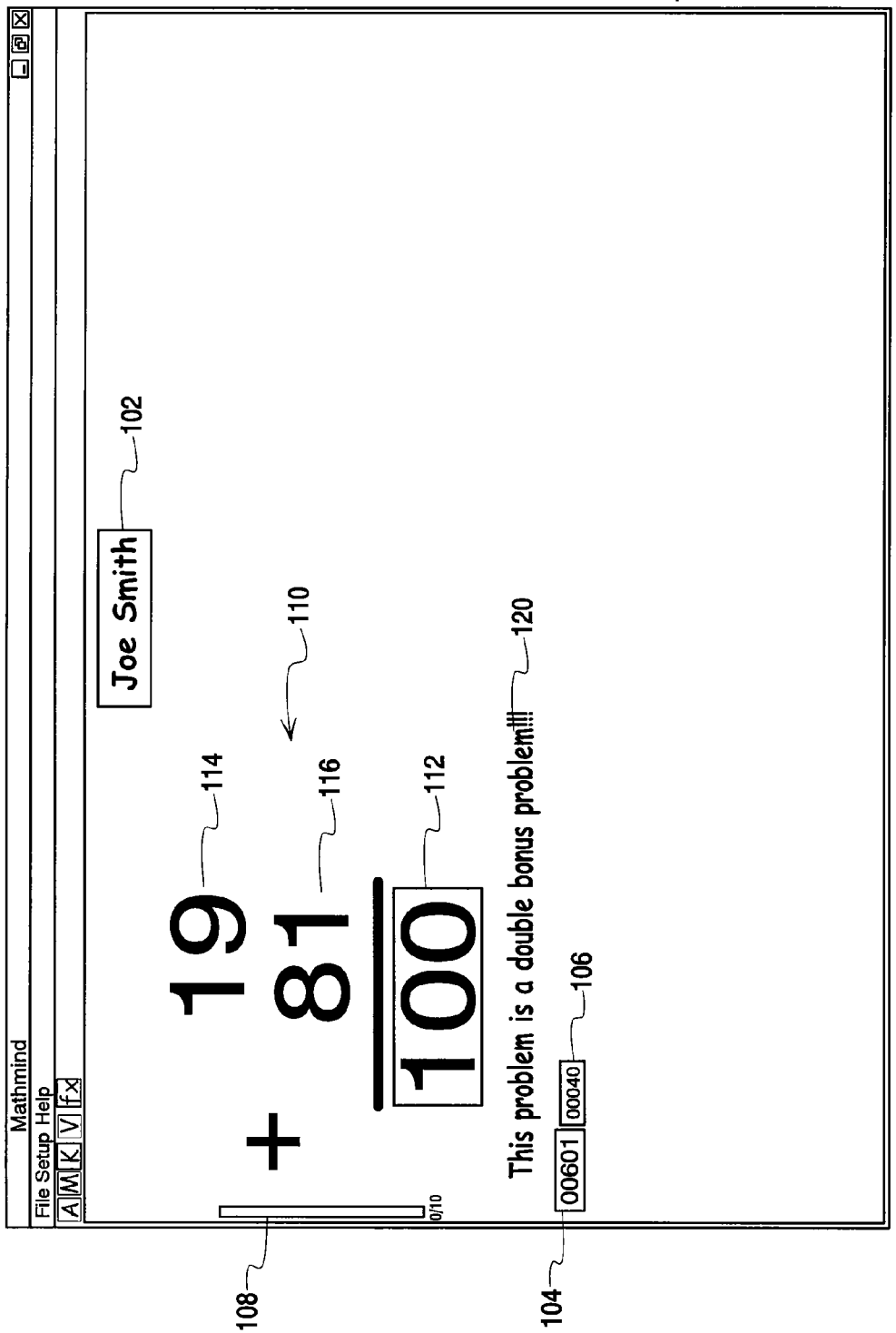

After pressing the enter button, the answer prompt 120 indicates whether the answer or response provided is correct or incorrect. As shown in FIG. 8, the attempt or response of "109" is incorrect and the answer prompt 120 encourages the student to try again. Thus, the student may again attempt to provide the correct answer. In this manner, the problem session encourages the student to keep trying until they provide the correct answer. Accordingly, the student is able to work at their own pace. In addition, performance statistics relating to the number of attempts entered by the student working on each problem until they get it right are stored so that the data can be used to identify areas where improvement may be needed.

Furthermore, the statistics which are recorded for each problem can be analyzed to determine whether subsequent problems should be more difficult or easier based on the student's performance. A decision to make future problems easier, maintain the same level of difficulty or increase the level of difficulty may be made based on historical performance. Recorded performance statistics or parameters such as, response time, answer status, and number of attempts, and the like. When such an analysis indicates that the student is making fewer mistakes and responding faster, harder problems may be generated to keep pace with the student's progress.

Figure 10:
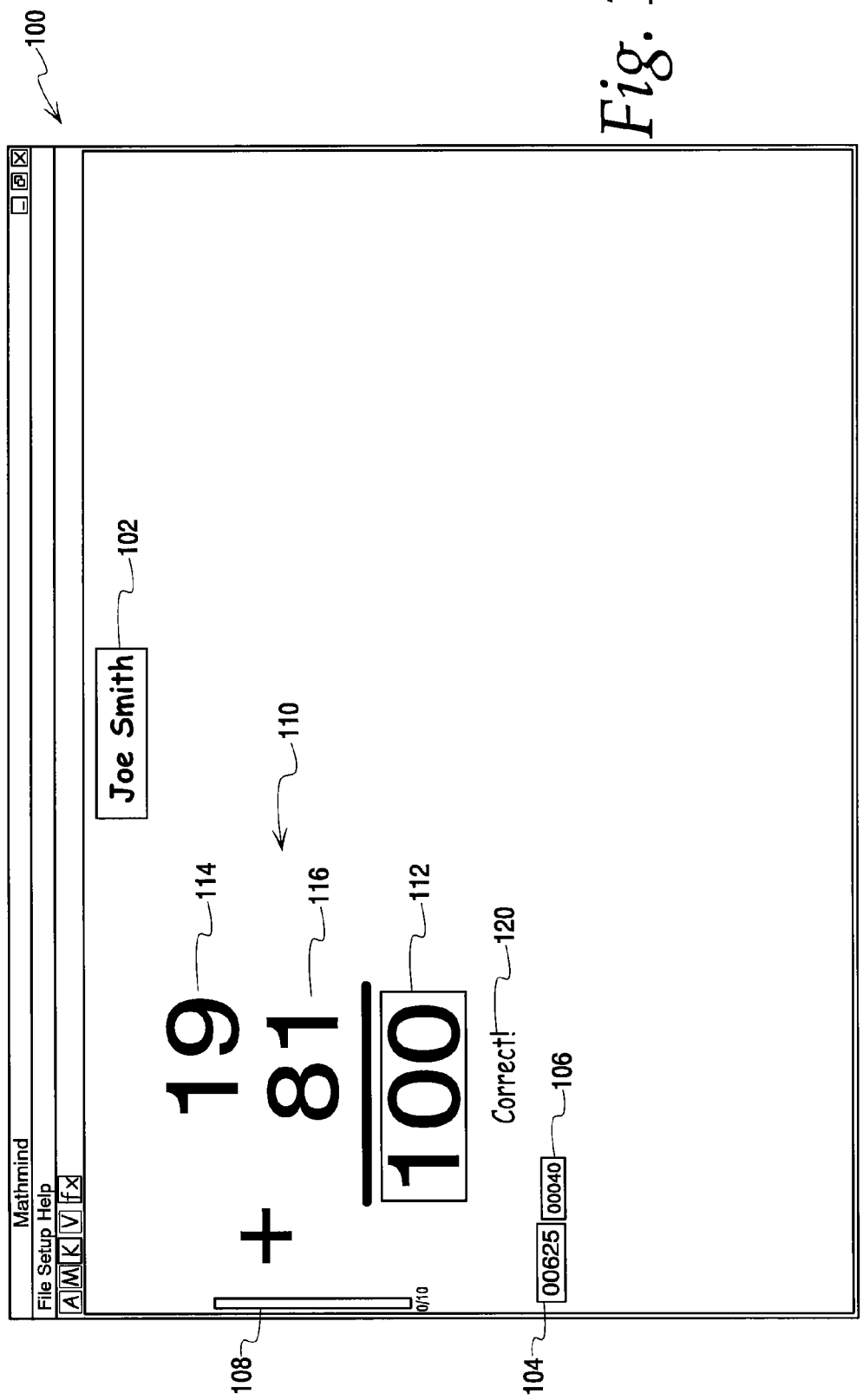

In FIG. 9, the student has again entered an answer in the solution window 112. The answer entered by the student in this second attempt is the number "100." Again, the student must press the enter button on the keyboard to check the answer. This time the answer is correct, as indicated in FIG. 10. The student has pressed the enter button to check their answer. The answer "100" entered in the solution window 112 on the student's second attempt is correct as indicated by answer prompt 120. In addition, the student's overall point total 104 has been updated from "601" to "625" to reflect the double points awarded (i.e., twenty-four points) to the student for correctly answering the displayed problem 110. As described above, after awarding the points for the correct answer, the problem session automatically advances to the next displayed problem and the problem session continues in the same manner.

In an embodiment, the student can press a reveal button (not shown) such as the space bar when they do not know or are having trouble calculating a correct response to a displayed problem, thereby skipping the problem. Pressing the reveal button allows the student to reveal the answer to the displayed problem and causes the problem session to automatically advance to the next problem. In an embodiment, the number of times the student presses the reveal button and the problem associated with pressing the reveal button will be recorded in the student's progress record, thereby offering further insight into a student's progress. In an embodiment, skipped problems are included in the total number of attempts by the student.

Figure 11:
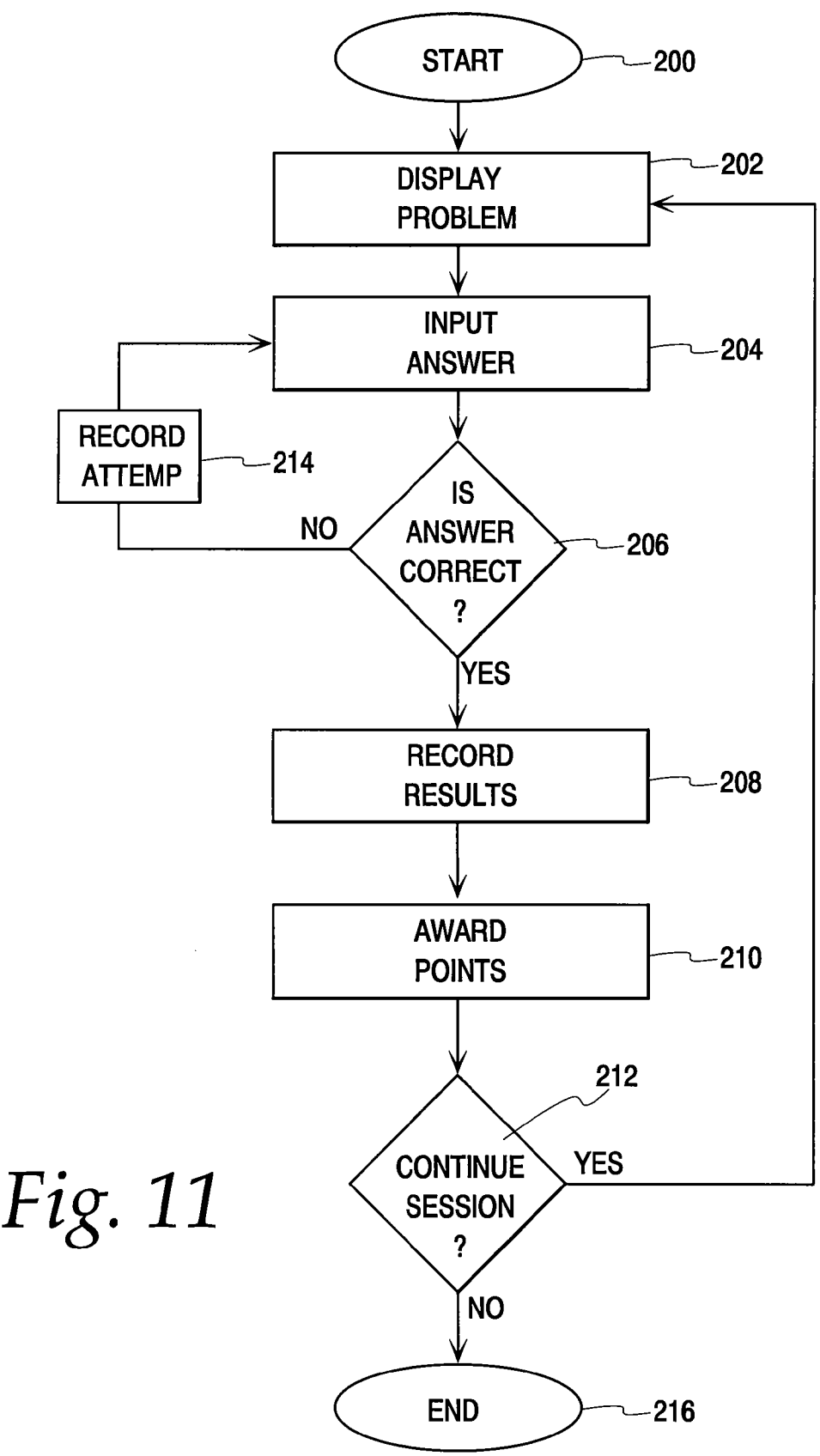
FIG. 11 is a flow chart illustrating a method for improving a student's math skills and tracking a student's performance.

FIG. 11 is a flow chart illustrating a method for improving a student's math skills and tracking a student's performance. The method starts by initiating a problem session at step 200. At step 202, a problem is displayed to the student, and at step 204, the student enters an answer to the displayed problem.

Once the student has entered a response a determination is made at step 206 whether or not the supplied answer is correct.

If the supplied answer is not correct, then the attempt is recorded at step 214, that is, the information concerning the attempt including the incorrect answer that was entered is recorded. The problem session then returns to step 204 where the student is allowed to re-enter an answer to the displayed problem. The problem session proceeds in this fashion until the student enters the correct answer. Once the student supplies the correct answer to the problem, the problem session proceeds to step 208 where the results are recorded. The results recorded at step 208 include the answer to the problem, the type of problem answered and the time taken to answer the problem.

At step 210, points are awarded to the student for correctly answering the problem. Once processing for a given problem is complete a check is made at step 212 to see whether the problem session is to continue. In one embodiment, the problem session ends only when the student affirmatively ends the problem session. In an alternative embodiment, the problem session automatically ends after a predetermined number of problems have been answered correctly. If the problem session is to continue, then the problem session proceeds to step 202 where a different problem is displayed and the process repeats in the manner described above. If the problem session is to end, then the problem session ends at step 216.

As described above, according to an embodiment of the present invention, an overall progress record is maintained for each student. The progress record includes data relating to the student's performance in problem sessions. The progress record, including performance statistics derived from the student's performance, may be sorted and viewed in multiple selectable formats. According to an embodiment of the invention, performance statistics reflecting the student's recorded progress record are selectively parsed and compiled, and then displayed in a graphical manner.

Figure 12:
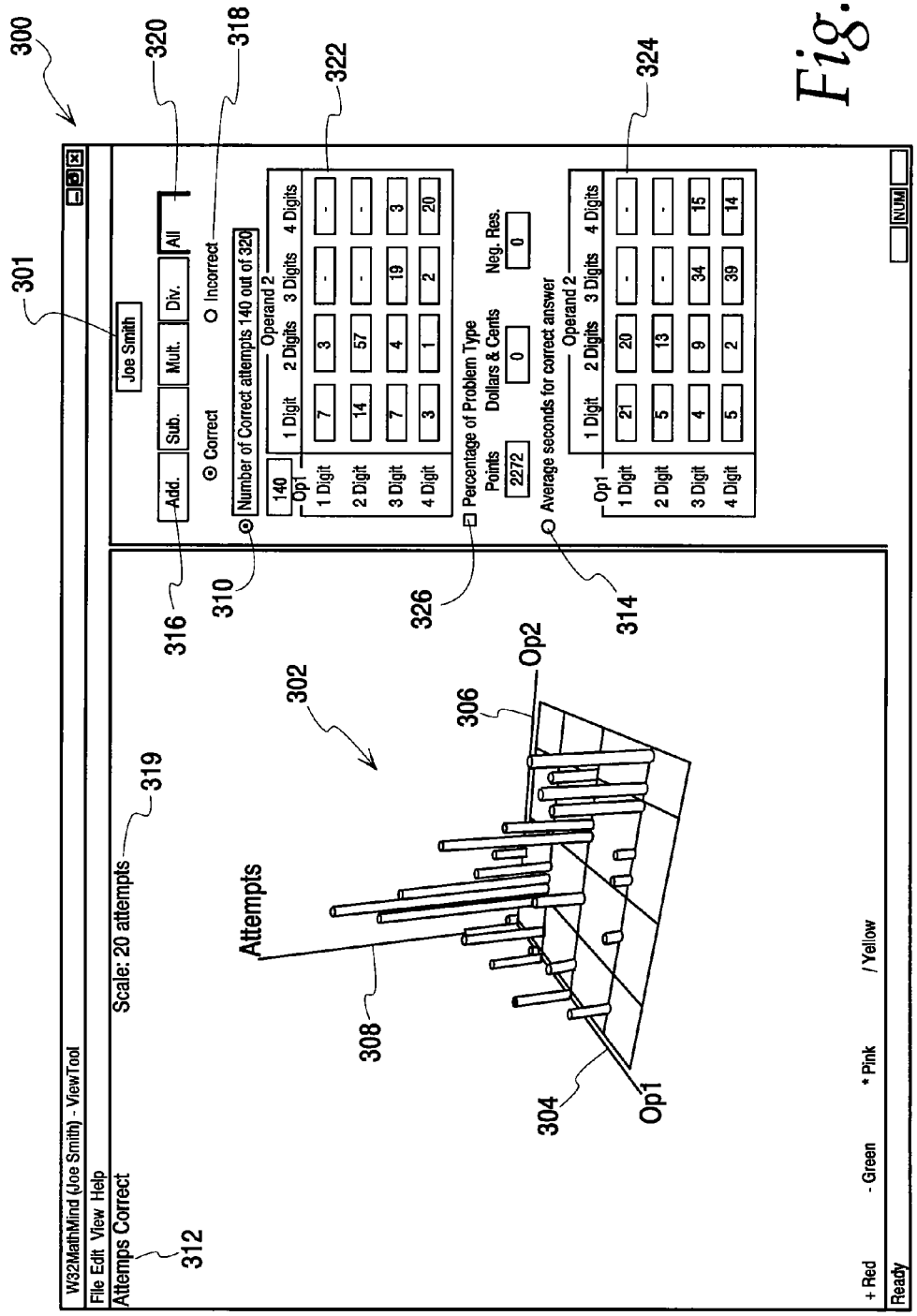
FIGS. 12-20 are diagrams illustrating performance statistics reflective of a student's overall progress record.

FIGS. 12-20 are diagrams illustrating performance statistics reflective of a student's overall progress record, and the various ways in which they may be presented. A performance screen 300 is shown in FIG. 12. The performance screen 300 illustrates performance statistics for the named in the student I.D. field 301. The performance screen 300 includes a 3-dimensional graph 302 having a first axis 304, a second axis 306 and a third axis 308. In the embodiment shown, the first axis 304 represents the number of digits in the first operand of the problems answered by the student and the second axis 306 represents the number of digits in the second operand. The third axis 308 represents selectable data, including for example, the number of problems attempted by the student, the number of correct attempts or responses, the number of incorrect attempts or responses, the average time required to enter each correct answer and an average time required for each incorrect answer.

The third axis 308 in the embodiment shown in FIG. 12 corresponds to the number of correct attempts as indicated by attempts selector 310 and graph title 312. The attempts selector 310 as well as seconds selector 314 are selectable options that allow the user to choose between displaying the number attempts or third axis 308. In addition, the user may select between correct and incorrect attempts and between average seconds for correct answers and average time for incorrect answers by selecting the correct selector 316 or the incorrect selector 318. In the displaying window shown in FIG. 12, since both the correct selector 316 and the attempts selector 310 are selected, the third axis 308, represents the number of correct attempts. Further, it should be appreciated that the data presented in the 3-dimensional graph 302 is scaled as indicated by scale legend 319.

The 3-dimensional graph 302 may be employed to display data for each of the selected mathematical operators (i.e., addition, subtraction, multiplication and division) either individually or collectively. In FIG. 12, the data are collectively displayed because operator selector 320 "All" has been selected, thereby indicating that data for all of the mathematical operators are to be displayed on the 3-dimensional graph 302. It should be appreciated that the data for the mathematical operators displayed on the 3-dimensional graph 302 can be distinguished by using different colors or shading for each unique operator.

Performance screen 300 also includes an attempts table 322 and a seconds table 324 which displays the performance data in a tabular format rather than a graphical format. The data displayed by the attempts table 322 and the seconds table 324, like the data displayed by the 3-dimensional graph 302, also may be selectively displayed in a manner similar to that described above. Performance screen 300 further includes a percentage selector 326 which enables the user to selectively view the attempts table 322 as the percentage of correct or incorrect attempts rather than the raw number of correct or incorrect attempts.

It should be appreciated that the data selectively presented by 3-dimensional graph 302, attempts table 322 and seconds table 324 provides an extensive and adaptive way for a user to view a student's progress record and present performance statistics. In addition, it will be evident from the following figures that the data can be selectively presented in a way that isolates problem areas or areas that may need improvement as well as areas in which a student excels.

Figure 13:
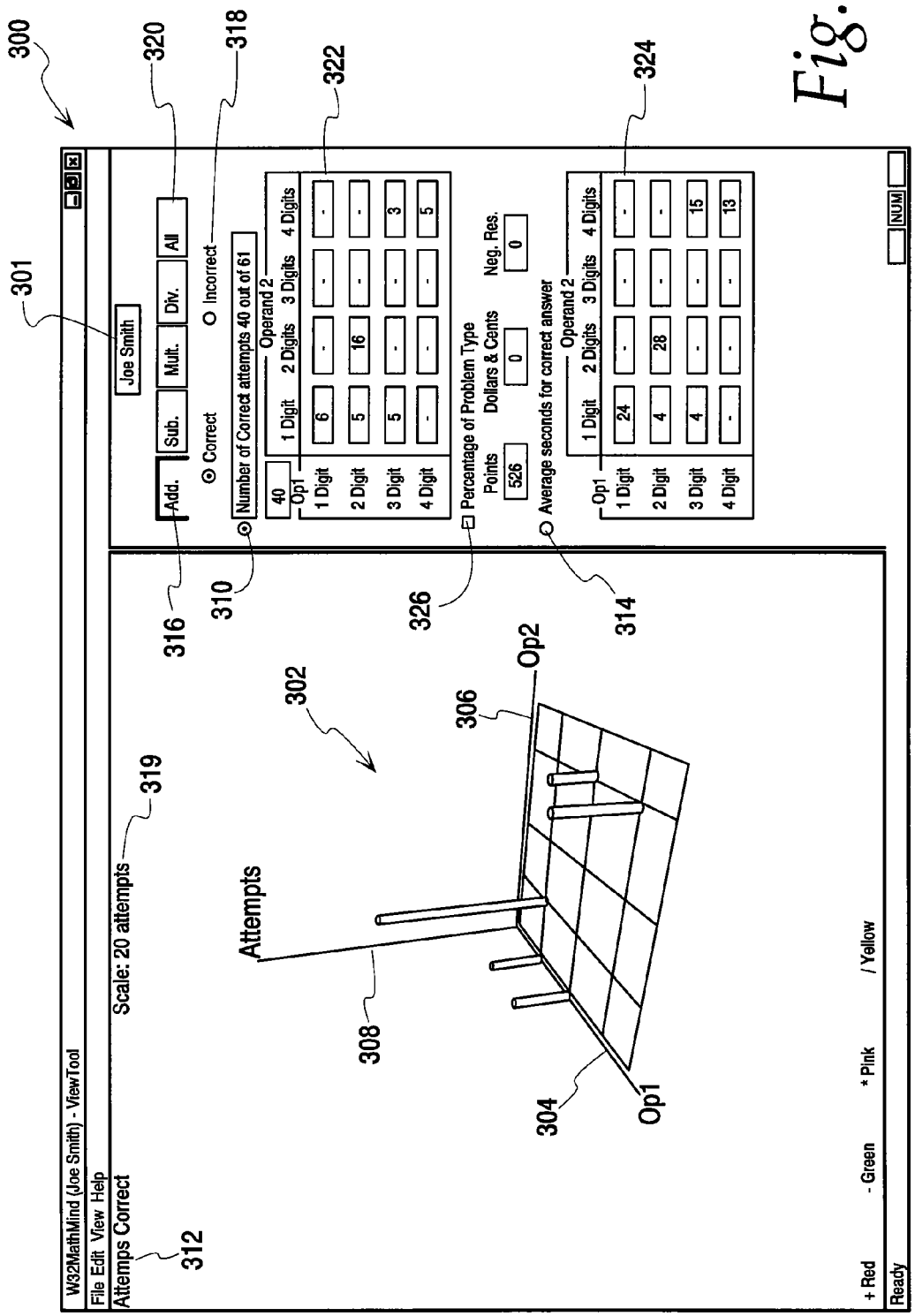

The problem screen 300 in FIG. 13 includes the 3-dimensional graph 302 which displays the number of correct attempts for addition problems only this display mode is accessed by selecting operator selector "Add." 320 Likewise, the attempts table 322 and the elapsed time table 324 display only performance data relating to currently answered addition problems. When the performance statistics are limited to a single area in this manner, the graph is easier to read and it is easier to identify the student's problem areas as well as determining their strengths.

Figure 14:
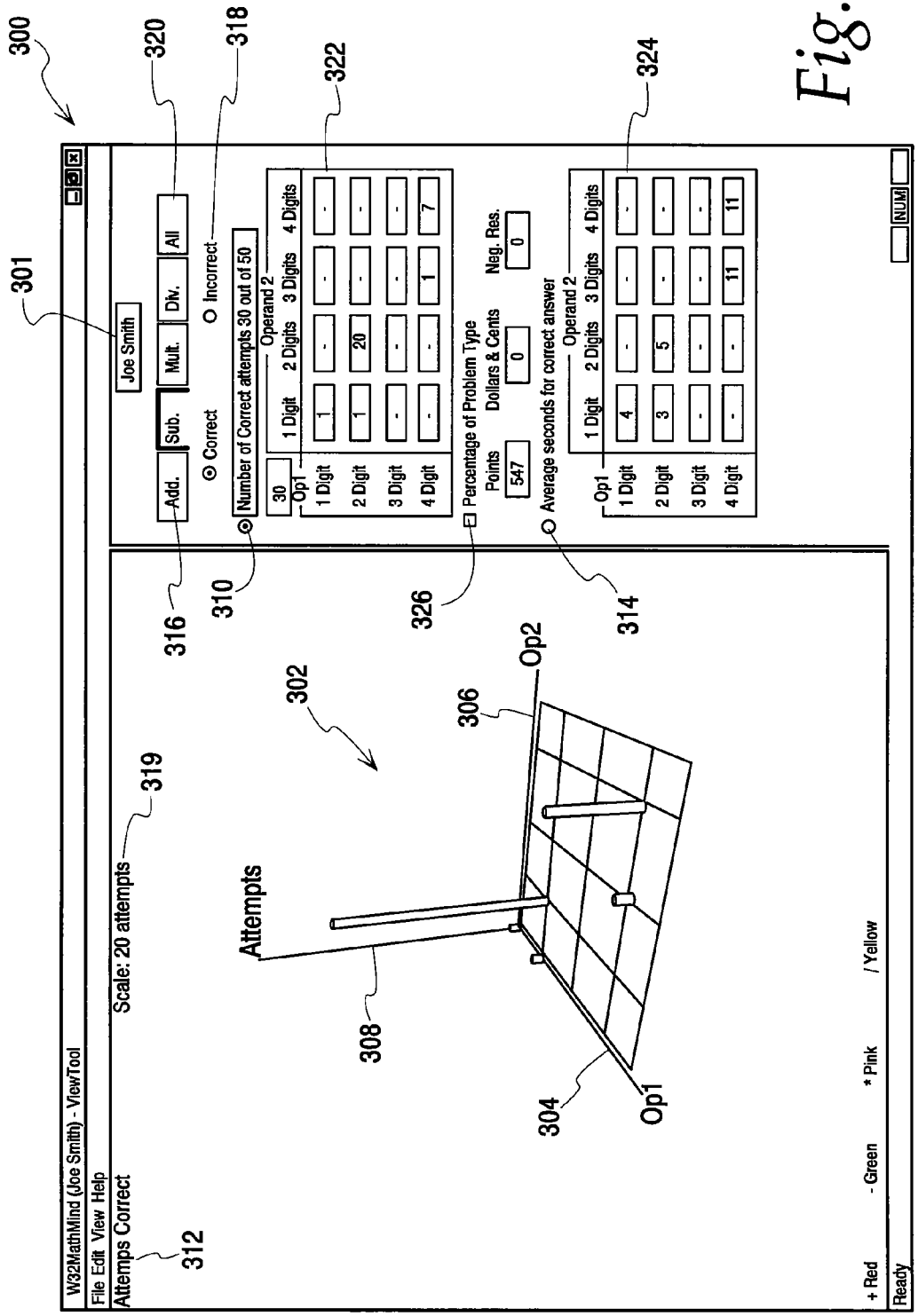

The 3-dimensional graph 302 displayed on the performance screen 300 shown in FIG. 14 displays only the number of correct attempts for subtraction problems. This display mode is accessed by selecting the operator selector "Sub." 320. Similarly, the attempts table 322 and the elapsed time table 324 display only performance data relating to correctly answered subtraction problems. Again, viewing performance information that has been limited to a single mathematical operator allows the user to more easily identify the student's strengths and weaknesses. For example, it is easy to see from the graph 302 and the attempts table 322 that a majority of the problems that the student answered correctly were subtraction problems having two digits in each operand.

Figure 15:
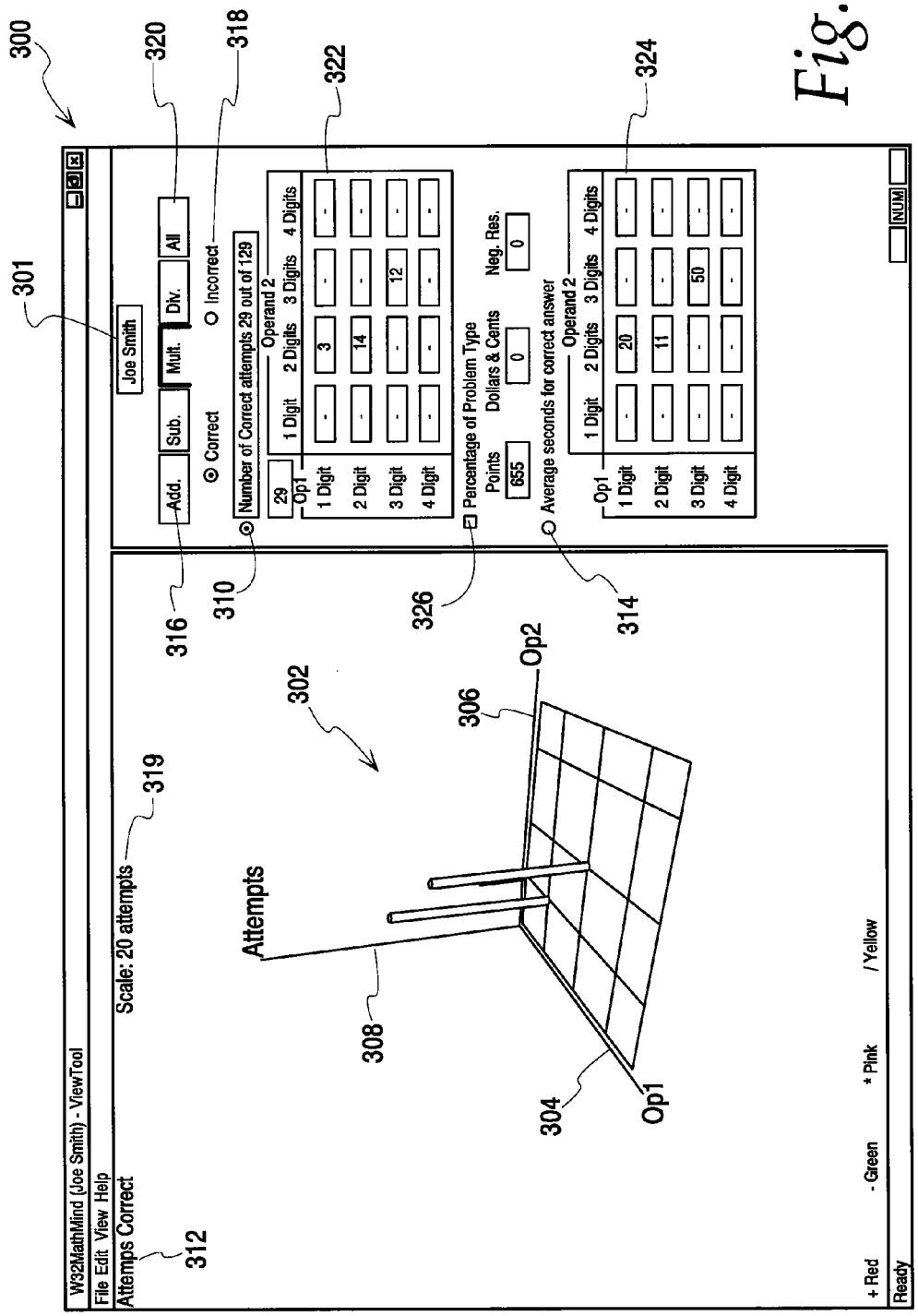
Figure 16:
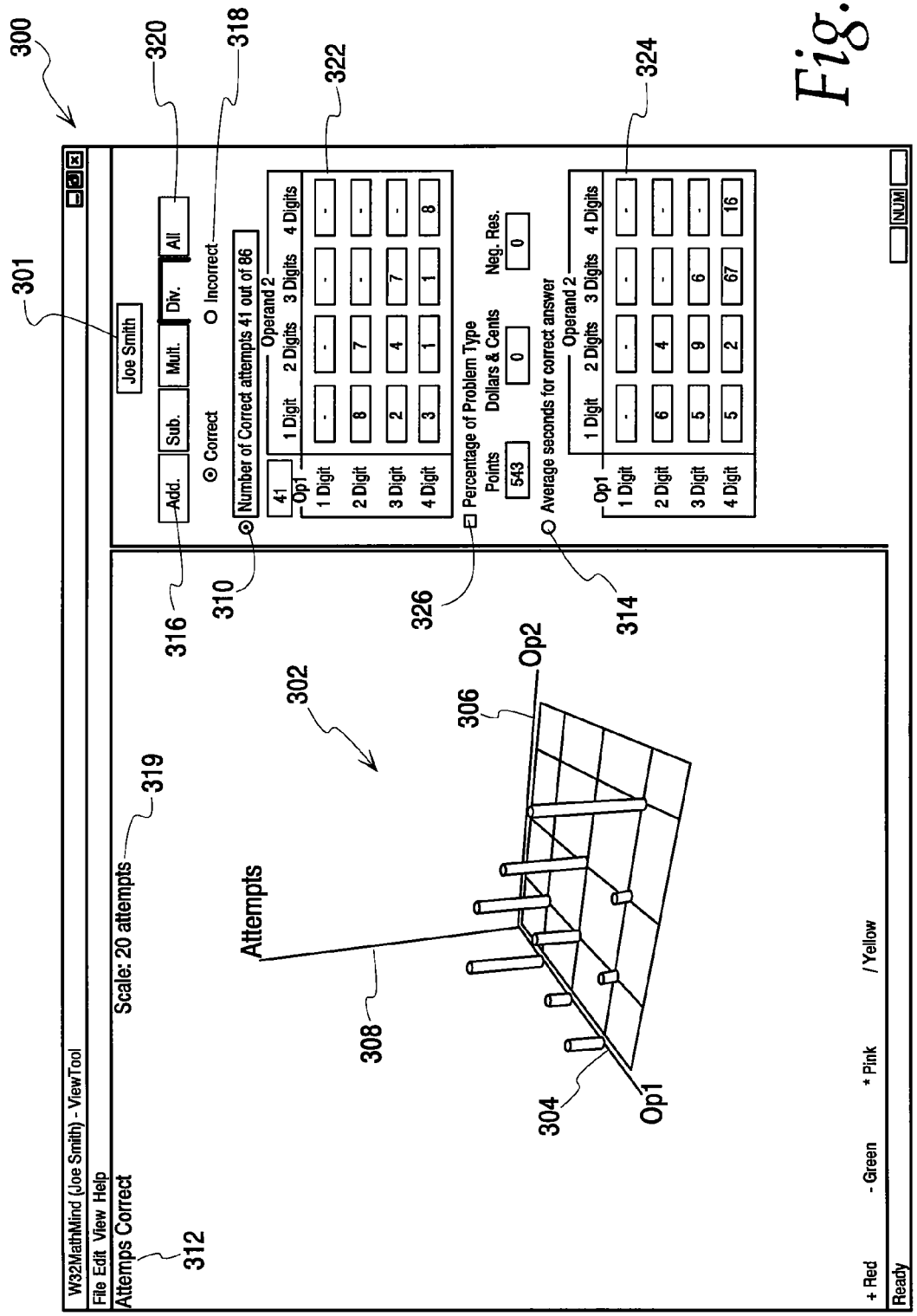

The problem screen 300 in FIG. 15 includes the 3-dimensional graph 302 which displays the number of correct attempts for multiplication problems only this display mode is accessed by selecting the indicated operator selector "Mult." 320. Again, the attempts table 322 and the elapsed time table 324 display only performance data relating to correctly answered multiplication problems. Similarly, the 3-dimensional graph 302, the attempts table 322 and the elapsed time table 324 of FIG. 16 all display performance data for division problems only as indicated by the selection of operator selector 320 "Div."

Figure 17:
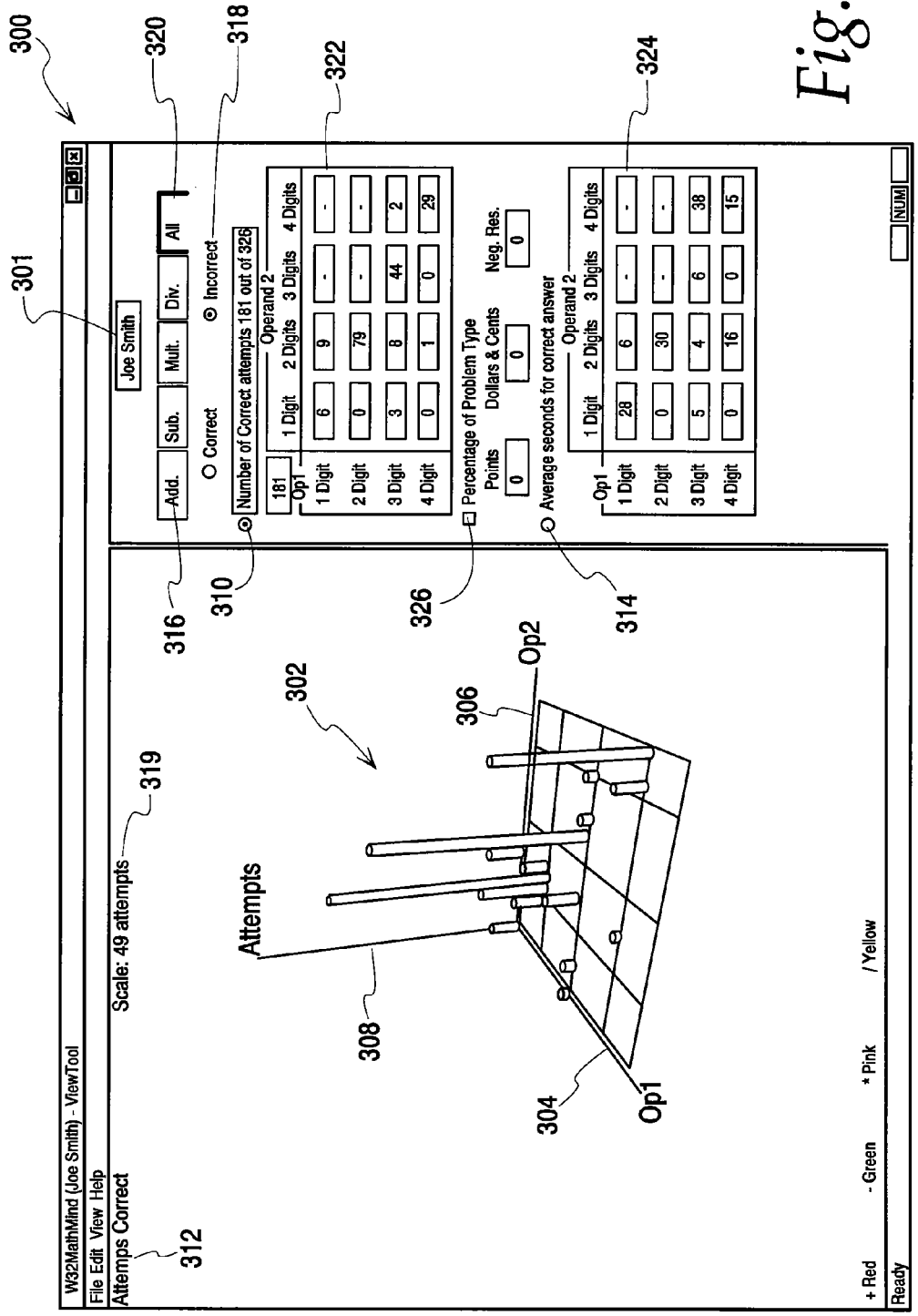

The problem screen 300 in FIG. 17 includes the 3-dimensional graph 302 which displays the number of incorrect attempts for all problems as indicated by the selection of operator selector 320 "All" and selection of the incorrect selector 318. Similarly, the attempts table 322 and the elapsed time table 324 also display performance data relating to all incorrect answers and attempts. It should be appreciated that the displayed data and the selectable options make it much easier to identify a student's potential strengths and weaknesses. For example, the student named in the student I.D. field 301 did not incorrectly answer any problems where the first operand included two digits and the second operand included one digit, indicating a possible strength. Conversely, the student incorrectly answer a large number of problems where both operands included two digits, indicating an area of weakness. It should be appreciated that evaluating the incorrect answers and attempts by viewing only selected mathematical operators could further isolate and identify the areas where a student may excel or may need improvement.

Figure 18:
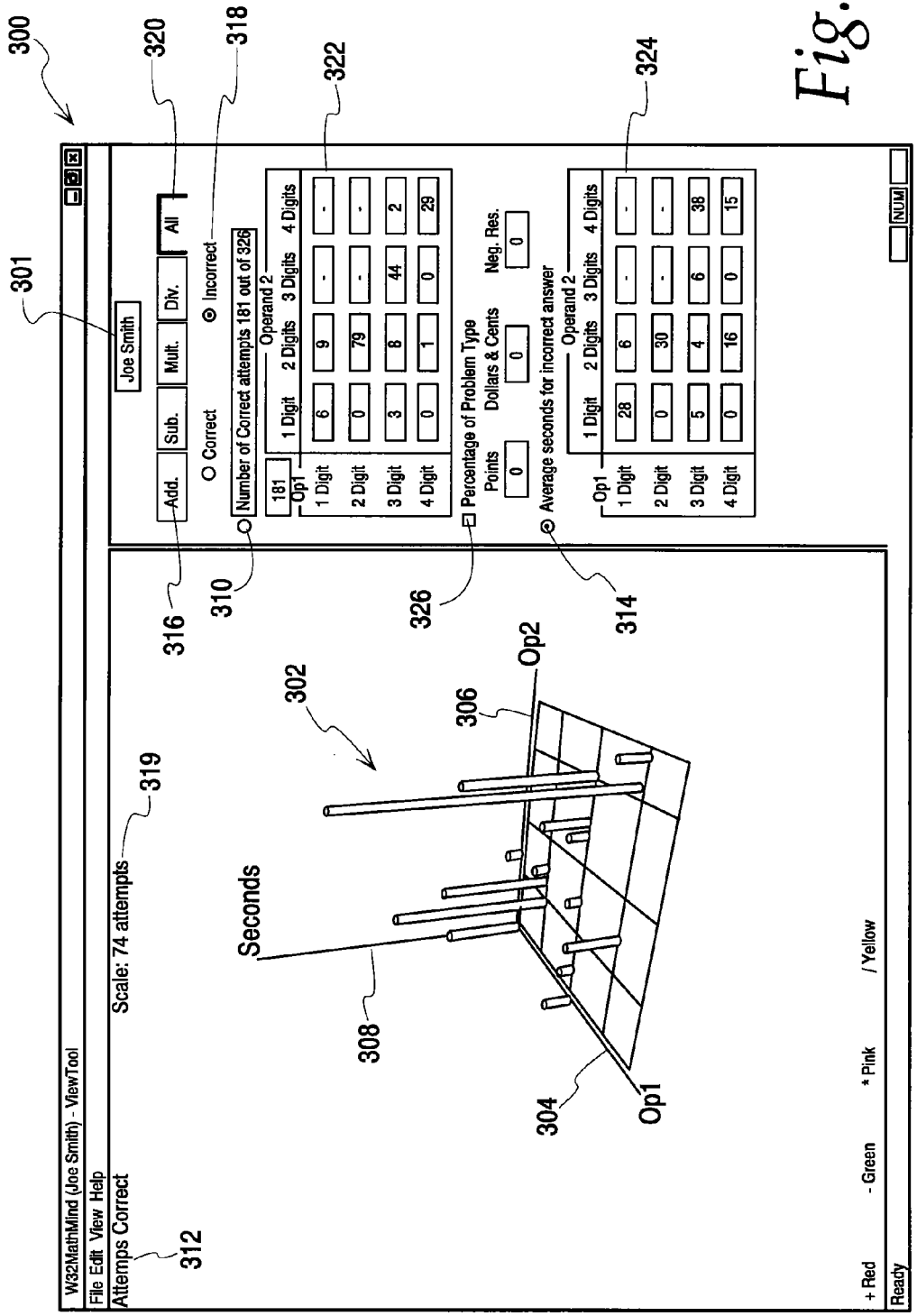
Figure 19:
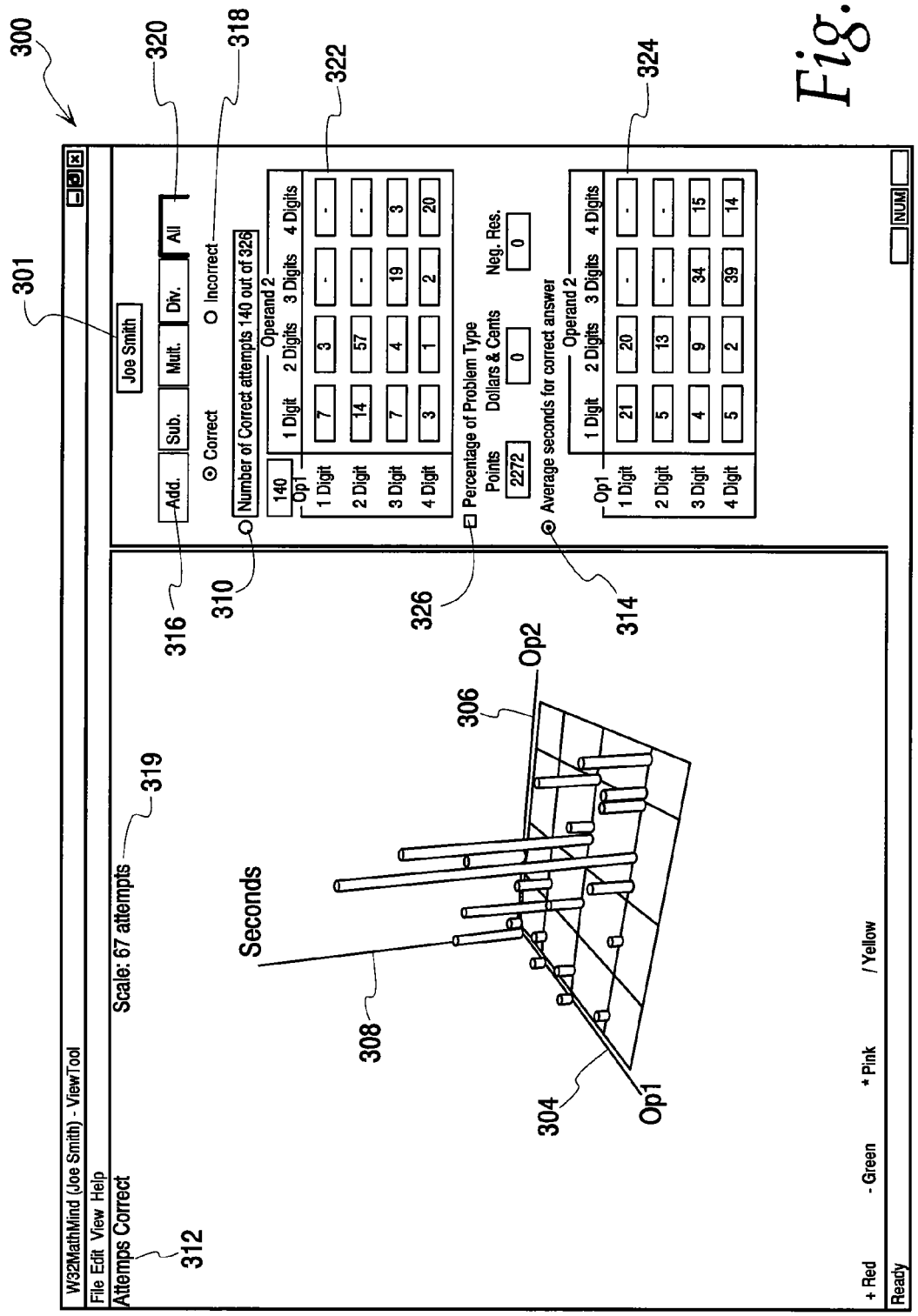

As shown in FIG. 18, the performance screen 300 includes the 3-dimensional graph 302 where the third axis 308 has been selected to represent the average number of seconds for each incorrect answer to be entered for problems involving all four operators. This display mode is accessed by selecting the incorrect selector 318, operator selector "All" 320 and seconds selector 314. Similarly, the third axis 308 in the 3-dimensional graph 302 in FIG. 19 shows the average number of seconds required for the student to enter the correct answers for all problems. As with the other display modes the user may further examine the data by viewing only problems involving a single mathematical operator. It should be appreciated that the ability to examine performance based on the number of attempts and the average amount of time for answers to be entered, both for correct and incorrect answers, offers the user flexibility in examining a students performance and additional insight into the student's progress.

In an embodiment of the invention the 3-dimensional graph 302 may be physically manipulated to assist the user in viewing the data contained in the graph 302. Accordingly, the user may physically rotate the graph 302 in 3-dimensions to better view and examine all of the performance statistics contained in the graph 302. As an illustration of this capability, the 3-dimensional graph 302 shown in FIG. 20 has been rotated from the position shown in FIGS. 12-19.

Figure 20:
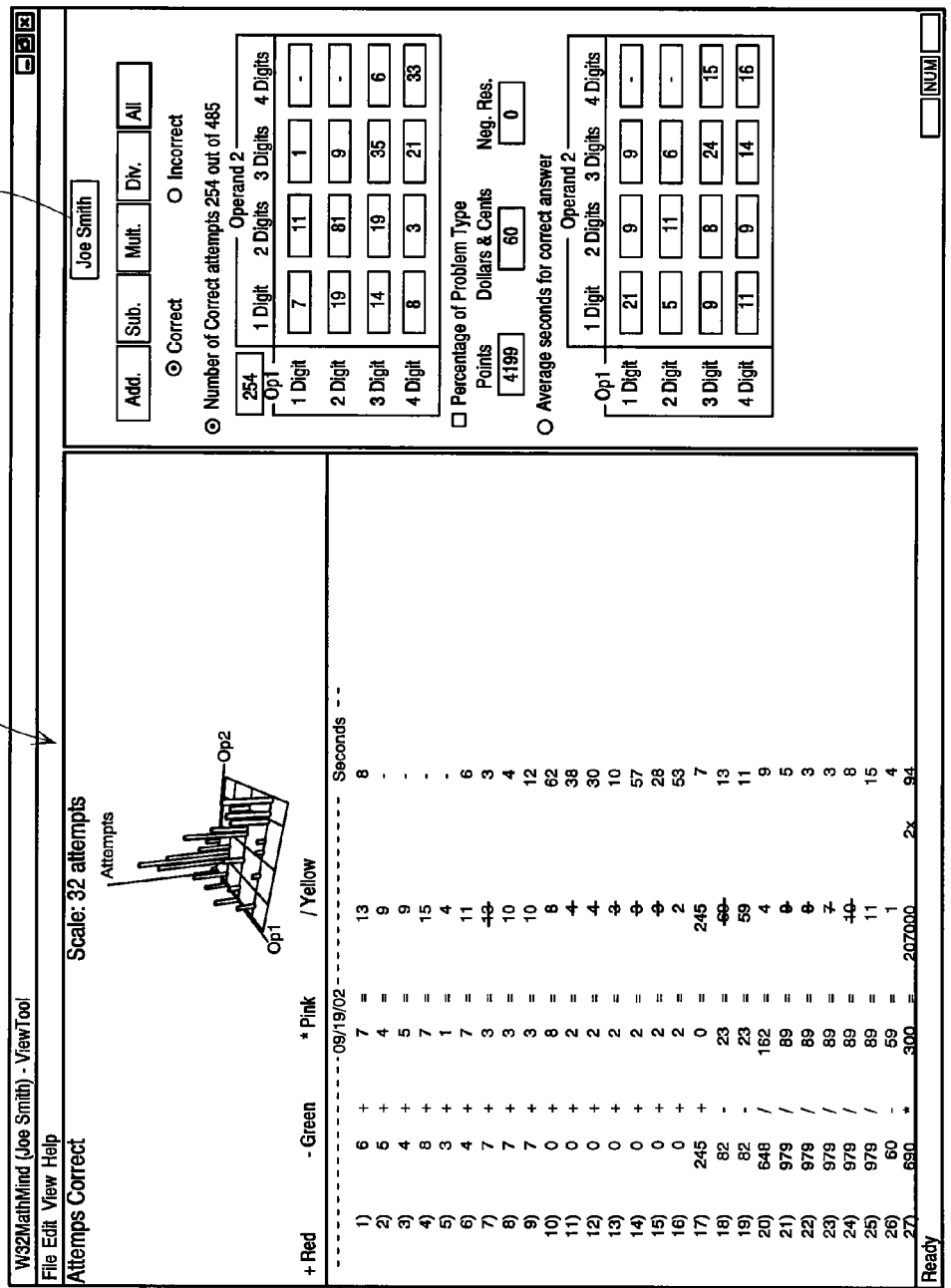

FIG. 20 shows an additional feature of the performance screen 300 according to an embodiment of the present invention. As shown in FIG. 20, the performance screen 300 further includes a text window 330. Text window 330 displays information for each of the problems attempted by the student. The information displayed in text window 330 includes the date each of the problems were attempted, the sequential number of the problems attempted, as well as the problems themselves, and each response made by the student, whether correct or incorrect, and the number of seconds taken by the student for each attempt. In addition, the text window includes information indicating whether or not the displayed problem was a double bonus problem.

In one embodiment, the text window 330 includes information relating the student's use of the reveal button, described above. For instance, problems 2) to 5) in text window do not have a number of seconds per attempt associated with them. Instead, there is a "-" (dash) associated with each of these problems under the seconds heading. The use of the "-" (dash) is one indicator that the student used the reveal button. In addition, colors can be used to further identify and distinguish the type of answer. For example, a correct answer could be a first unique color, an incorrect answer could be a second unique color and a revealed answer could be a third unique color. Thus, the text window 330 further enhances the tracking and monitoring ability of the present invention.

The above-described problem session employing the problem screen 100 may be generated in one embodiment using computer software or the like. In an embodiment, the problem session runs on a personal computer and the students' overall progress records including performance statistics, are stored on a memory device within the personal computer. Similarly, the performance screen 300 for displaying the students' overall progress record and performance statistics can also be generated and displayed using computer software operating on a personal computer or the like. Thus, the students' progress record can be accessed and parsed and the performance statistics can be compiled using, for example, a computer having a processor, a display and an appropriate memory device.

In another alternative embodiment, the problem session is run from a centralized location such as a centralized computer or collection of computers (e.g., a server). Thus, the problem session is capable of being distributed to a number of students via a computer network, such as an internet or an intranet. In this fashion, each student is able to access the problem session using a client program (e.g., a web browser). Running the problem session from a centralized location enables each of the student's progress records to be recorded in a centralized location, thereby facilitating data compilation and analysis. Further, it enables a student to access the problem session from a remote location which can be beneficial if, for example, a student is out of town to attend a funeral or a student is forced to miss an extended period of time in school due to a medical condition.

In another alternative embodiment, the problem session runs on a handheld device or a handheld computing device. Suitable handheld computing devices include but are not limited to laptop or palmtop computers such as a personal digital assistants. Personal digital assistants are desirable in that they are generally programmable and can easily and inexpensively be configured to meet the needs of the present invention. Additionally, most handheld computing devices include synchronization functions that allow data stored on a memory device within the handheld device to easily be transferred from the handheld device to an other device such as a personal computer or a computer network.

Accordingly, in an embodiment of the invention, a student may complete a number of problem sessions on a handheld computing device. The student's ongoing progress record can be temporarily stored on the hand held device and then transferred directly to a personal computer or a computer network via the handheld device's synchronization function. Once the student's data have been transferred to the personal computer, a teacher, parent, or other interested person may selectively view the student's progress record and performance statistics to monitor and track the student's mathematical performance. In addition, the teacher or parent could also merge the student's progress record with the student's preexisting progress record to maintain an ongoing overall progress record. The teacher or parent could also export a student's progress record in a readable format such as that shown in text window 330 of FIG. 20.

In a further alternative embodiment, the problem session runs on a video game console. Accordingly, it should be appreciated that the apparatus for running problem sessions according to the present invention can be any suitable device having a processor, a display and an input device for receiving input from the student.

Further, it should be appreciated that a teacher could use the present invention to monitor the progress of an entire class or group of students. In addition, the teacher could compile overall class or group statistics to assist, for example, in preparing for standardized or performance tests. Even further, the collated statistics gathered from a large body of student's can be used for assessment purposes for monitoring the effectiveness of teachers, schools and entire school districts. The statistics also be used to compare school districts, and the like.

In an embodiment, data recorded according to the present invention (e.g., progress records) can be used in place of year-end arithmetic achievement or performance tests. Using this data provides an overall record of a student's performance. The present invention therefore compensates for a number of situations, such as absent students on test days or student's who may not perform optimally under exam conditions. It should be appreciated that unlimited analysis methods or procedures can be applied to the recorded data for performance measurement or enhancement purposes.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An apparatus for interactively improving a student's math skills and tracking said student's progress, the apparatus comprising:
   a display adapted to display math problems;
   an input interface for receiving said student's responses to the math problems displayed on the display; and
   a processor adapted to:
   (a) generate said math problems displayed on said display,
   (b) evaluate said student's responses,
   (c) determine whether said student has correctly answered said math problems based on said evaluation of said student's responses,
   (d) award points to said student when said student correctly answers a math problem
   (e) cause a memory device to store a plurality of statistics related to said student's performance in answering said math problems, and
   (f) cause the display to display a 3-dimensional graph of said statistics, said 3-dimensional graph including a first axis, a second axis, and a third axis, said first axis and said second axis relating to a complexity of the math problems addressed by the student, and said third axis relating to the student's performance on said math problems.

2. The apparatus of claim 1 wherein said first axis represents a number of digits in a first operand of at least one of the math problems addressed by the student, and the second axis represents a number of digits in a second operand of at least one of the math problems addressed by the student.

3. The apparatus of claim 1 wherein the data represented by at least one selected from the group consisting of: said first axis, said second axis, and said third axis, is selectable.

4. The apparatus of claim 1 wherein the data represented by said third axis is selectable from the group consisting of: a number of math problems attempted, a number of correct responses, a number of incorrect responses, an average time required for each correct answer, and an average time for each incorrect answer.

5. The apparatus of claim 1 wherein said displayed statistics include cumulative statistics from a previous session.

6. The apparatus of claim 1 wherein said apparatus comprises a personal computer.

7. The apparatus of claim 1 wherein said apparatus comprises a handheld device.

8. The apparatus of claim 7 wherein said handheld device is a programmable personal digital assistant.

9. The apparatus of claim 8, which is configured to transfer said statistics stored in said memory to an other device via a synchronization function performed between said handheld device and said other device.

10. The apparatus of claim 9 wherein said other device comprises a personal computer.

11. The apparatus of claim 9 wherein said other device comprises a computer network.

12. An apparatus for interactively improving a student's math skills and tracking said student's progress, the apparatus comprising:
   a display adapted to display math problems;
   an input interface for receiving said student's responses to the math problems displayed on the display; and
   a processor adapted to:
      (a) generate said math problems displayed on said display,
      (b) evaluate said student's responses,
      (c) determine whether said student has correctly answered said math problems based on said evaluation of said student's responses,
      (d) award points to said student when said student correctly answers a math problem,
      (e) cause a memory device to store a plurality of statistics related to said student's performance in answering said math problems, and
      (f) cause the display to display a 3-dimensional graph of said statistics, the statistics displayed in said 3-dimensional graph selectable according to mathematical operators employed in said math problems.

13. The apparatus of claim 12 wherein said apparatus comprises a personal computer.

14. The apparatus of claim 12 wherein said apparatus comprises a handheld device.

15. The apparatus of claim 14 wherein said handheld device is a programmable personal digital assistant.

16. The apparatus of claim 14, which is configured to transfer said statistics stored in said memory to an other device via a synchronization function performed between said handheld device and said other device.

17. The apparatus of claim 16 wherein said other device comprises a personal computer.

18. The apparatus of claim 16 wherein said other device comprises a computer network.

19. An apparatus for interactively improving a student's math skills and tracking said student's progress, the apparatus comprising:
   a display adapted to display math problems;
   an input interface for receiving said student's responses to the math problems displayed on the display; and
   a processor adapted to:
      (a) generate said math problems displayed on said display,
      (b) evaluate said student's responses,
      (c) determine whether said student has correctly answered said math problems based on said evaluation of said student's responses,
      (d) award points to said student when said student correctly answers a math problem,
      (e) cause a memory device to store a plurality of statistics related to said student's performance in answering said math problems, and
      (f) cause the display to display a 3-dimensional graph of said statistics, wherein statistics relating to math problems employing different mathematical operators are displayed in different colors.

20. A method of tracking a student's progress in developing math skills comprising the steps of:
   generating a plurality of problems to be solved by the student;
   causing at least one display device to sequentially display the plurality of problems to be solved by the student;
   receiving the student's answers to the problems with at least one input device;
   maintaining a database which records each problem presented to the student and every response received from the student to each problem presented;
   causing a processor to determine whether each answer is a correct answer; and
   causing the processor to generate statistics regarding the student's performance in at least one of a plurality of selectable formats, wherein one of said selectable formats comprises a 3-dimensional graph of said statistics, said 3-dimensional graph including a first axis, a second axis, and a third axis, said first axis and said second axis relating to a complexity of the problems addressed by the student, and said third axis which relates to the student's performance on said problems.

21. The method of claim 20 wherein said first axis represents a number of digits in a first operand of at least one of the problems addressed by the student, and the second axis represents a number of digits in a second operand of at least one of the problems addressed by the student.

22. The method of claim 20 wherein the data represented by at least one selected from the group consisting of said first axis, said second axis, and said third axis, is selectable.

23. The method of claim 20 wherein the data represented by said third axis is selectable from the group consisting of: a number of attempted problems, the number correct student responses, the number of incorrect responses, the average time for each correct answer, and the average time for each incorrect answer.

24. A method of tracking a student's progress in developing math skills comprising the steps of:
   generating a plurality of problems to be solved by the student;
   causing at least one display device to sequentially display a plurality of problems to be solved by the student;
   receiving the student's answers to the problems with at least one input device;
   maintaining a database which records each problem presented to the student and every response received from the student to each problem presented;
   causing a processor to determine whether each answer is a correct answer; and
   causing the processor to generate statistics regarding the student's performance in at least one of a plurality of selectable formats, wherein one of said selectable formats comprises a 3-dimensional graph of said statistics, the statistics displayed in said 3-dimensional graph being selectable according to mathematical operators.

25. A method of tracking a student's progress in developing math skills comprising the steps of:
   generating a plurality of problems to be solved by the student;

causing at least one display device to sequentially display a plurality of problems to be solved by the student;
receiving the student's answers to the problems with at least one input device;
maintaining a database which records each problem presented to the student and every response received from the student to each problem presented;
causing a processor to determine whether each answer is a correct answer; and
causing the processor to generate statistics regarding the student's performance in at least one of a plurality of selectable formats, wherein one of said selectable formats comprises a 3-dimensional graph, statistics relating to displayed problems having different mathematical operators being displayed in different colors.

\* \* \* \* \*